United States Patent
Shiba

(10) Patent No.: US 10,951,709 B2
(45) Date of Patent: Mar. 16, 2021

(54) STORAGE DEVICE, STORAGE SYSTEM, AND METHOD

(71) Applicant: TOSHIBA MEMORY CORPORATION, Minato-ku (JP)

(72) Inventor: Youichirou Shiba, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/296,585

(22) Filed: Mar. 8, 2019

(65) Prior Publication Data
US 2020/0092368 A1  Mar. 19, 2020

(30) Foreign Application Priority Data
Sep. 19, 2018  (JP) .............................. JP2018-174808

(51) Int. Cl.
*H04L 29/08* (2006.01)
*H04L 12/741* (2013.01)
*H04W 40/02* (2009.01)

(52) U.S. Cl.
CPC .......... *H04L 67/1097* (2013.01); *H04L 45/54* (2013.01); *H04L 45/745* (2013.01); *H04W 40/02* (2013.01)

(58) Field of Classification Search
None
See application file for complete search history.

(56) References Cited

U.S. PATENT DOCUMENTS

| | | | |
|---|---|---|---|
| 6,647,264 B1 * | 11/2003 | Sasamoto | H04W 68/00 370/328 |
| 8,688,630 B2 | 4/2014 | Bernbo et al. | |
| 9,026,559 B2 | 5/2015 | Bernbo et al. | |
| 9,329,955 B2 | 5/2016 | Bernbo et al. | |
| 9,495,432 B2 | 11/2016 | Bernbo et al. | |
| 9,940,042 B2 | 4/2018 | Agetsuma | |
| 10,051,142 B1 * | 8/2018 | Villena | H04N 1/2125 |
| 2014/0141823 A1 * | 5/2014 | Kozakaya | G06T 7/0002 455/500 |
| 2016/0072573 A1 | 3/2016 | Tohzaka et al. | |
| 2016/0212212 A1 | 7/2016 | Bernbo et al. | |
| 2016/0277626 A1 * | 9/2016 | Sato | H04N 1/2158 |
| 2017/0359131 A1 * | 12/2017 | Mashimo | H04B 17/309 |
| 2018/0109966 A1 * | 4/2018 | Alexander | H04W 24/04 |
| 2019/0075488 A1 * | 3/2019 | Sarin | H04W 28/06 |

FOREIGN PATENT DOCUMENTS

| | | |
|---|---|---|
| JP | 2012-506582 | 3/2012 |
| JP | WO 2015/033451 A1 | 3/2015 |
| JP | 2016-058922 | 4/2016 |

* cited by examiner

Primary Examiner — James A Edwards
(74) Attorney, Agent, or Firm — Oblon, McClelland, Maier & Neustadt, L.L.P.

(57) ABSTRACT

According to one embodiment, a storage device includes a wireless communication circuit, a storage, and a controller circuit. The wireless communication circuit is configured to connect to an external first device by wireless communication. The storage has a storage region. The controller circuit is configured to correct first information on the basis of a first capacity which is a free space of the storage region of the storage. The first information is numerical information indicating quality of the wireless communication with the first device. The controller circuit obtains second information being the corrected first information.

18 Claims, 47 Drawing Sheets

| Destination | Next Hop | First Metric | FREE SPACE ON STORAGE |
|---|---|---|---|
| WSD101 | WSD102 | 60 | 32 GByte |
| WSD102 | WSD102 | 30 | 32 GByte |
| WSD104 | WSD106 | 30 | 16 GByte |
| WSD105 | WSD106 | 20 | 16 GByte |
| WSD106 | WSD106 | 10 | 16 GByte |
| WSD107 | WSD106 | 60 | 64 GByte |
| WSD108 | WSD106 | 40 | 64 GByte |
| WSD109 | WSD106 | 20 | 64 GByte |
| gateway202 | WSD106 | 40 | 0 GByte |

| Destination | Next Hop | First Metric | FREE SPACE ON STORAGE |
|---|---|---|---|
| WSD101 | WSD101 | 30 | 32 GByte |
| WSD102 | WSD102 | 20 | 32 GByte |
| WSD103 | WSD103 | 10 | 32 GByte |
| WSD104 | WSD103 | 40 | 16 GByte |
| WSD105 | WSD103 | 30 | 16 GByte |
| WSD106 | WSD103 | 20 | 16 GByte |
| WSD107 | WSD103 | 70 | 64 GByte |
| WSD108 | WSD103 | 50 | 64 GByte |
| WSD109 | WSD103 | 30 | 64 GByte |
| gateway202 | WSD101 | 50 | 0 GByte |

FIG.8

| Destination | Next Hop | Second Metric | FREE SPACE ON STORAGE |
|---|---|---|---|
| WSD101 | WSD102 | 120 | 32 GByte |
| WSD102 | WSD102 | 60 | 32 GByte |
| WSD104 | WSD106 | 106 | 16 GByte |
| WSD105 | WSD106 | 66 | 16 GByte |
| WSD106 | WSD106 | 26 | 16 GByte |
| WSD107 | WSD106 | 82 | 64 GByte |
| WSD108 | WSD106 | 62 | 64 GByte |
| WSD109 | WSD106 | 42 | 64 GByte |
| gateway202 | WSD106 | 122 | 0 GByte |

FIG.9

```
                                                    ┌33
┌─────────────────────────────────────────────────────┐
│ HASH VALUE #1,test1.txt,128000,20180803231214,Original │
│ HASH VALUE #2,test2.jpg,256000,20180903121027,Copy     │
│ HASH VALUE #3,test3.doc,512000,20180820103010,Copy     │
│ HASH VALUE #4,test4.xls,148215,20180707093000,Original │
│ HASH VALUE #5,test5.ppt,206732,20180501131126,Original │
│                           ⋮                            │
│                                                        │
└─────────────────────────────────────────────────────┘
```

| Destination | Next Hop | First Metric |
|---|---|---|
| gateway201 | gateway201 | 20(=0+20) |

FIG.23

| PORTION | ELEMENT | SETTING VALUE AT RECEPTION | SETTING VALUE AT TRANSFER |
|---|---|---|---|
| Header | Receiver Address | BROADCAST ADDRESS | BROADCAST ADDRESS |
| | Transmitter Address | ADDRESS OF gateway 201 | ADDRESS OF WSD 102 |
| | Destination Address | BROADCAST ADDRESS | BROADCAST ADDRESS |
| | Source Address | ADDRESS OF gateway 201 | ADDRESS OF gateway 201 |
| | Target Address | BROADCAST ADDRESS | BROADCAST ADDRESS |
| Body (Data) | Metric | 0 | 20 |
| | Originator Mesh STA Address | ADDRESS OF gateway 201 | ADDRESS OF gateway 201 |

FIG.24

| Destination | Next Hop | First Metric |
|---|---|---|
| gateway201 | gateway201 | 10(=0+10) |

FIG.25

| Destination | Next Hop | First Metric |
|---|---|---|
| gateway201 | WSD102 | 50(=20+30) |

FIG.26

| PORTION | ELEMENT | SETTING VALUE AT RECEPTION | SETTING VALUE AT TRANSFER |
|---|---|---|---|
| Header | Receiver Address | BROADCAST ADDRESS | BROADCAST ADDRESS |
| | Transmitter Address | ADDRESS OF gateway 201 | ADDRESS OF WSD 103 |
| | Destination Address | BROADCAST ADDRESS | BROADCAST ADDRESS |
| | Source Address | ADDRESS OF gateway 201 | ADDRESS OF gateway 201 |
| | Target Address | BROADCAST ADDRESS | BROADCAST ADDRESS |
| Body (Data) | Metric | 0 | 10 |
| | Originator Mesh STA Address | ADDRESS OF gateway 201 | ADDRESS OF gateway 201 |

FIG.27

| Destination | Next Hop | First Metric |
|---|---|---|
| gateway201 | WSD103 | 40(=10+30) |

FIG.28

| Destination | Next Hop | First Metric |
|---|---|---|
| gateway201 | WSD102 | 50(=20+30) |

FIG.29

| Destination | Next Hop | First Metric |
|---|---|---|
| gateway201 | WSD106 | 30(=20+10) |

FIG.30

| Destination | Next Hop | First Metric |
|---|---|---|
| gateway201 | WSD103 | 20(=10+10) |

FIG.31

| Destination | Next Hop | First Metric |
|---|---|---|
| gateway201 | WSD109 | 50(=30+20) |

FIG.32

| Destination | Next Hop | First Metric |
|---|---|---|
| gateway201 | WSD106 | 30(=20+10) |

FIG.33

| PORTION | ELEMENT | SETTING VALUE | |
|---|---|---|---|
| Header | Receiver Address | ADDRESS OF gateway 201 | - |
| | Transmitter Address | ADDRESS OF WSD 102 | - |
| | Destination Address | ADDRESS OF Gateway 201 | - |
| | Source Address | ADDRESS OF WSD 102 | - |
| Body (Data) | Target Mesh STA Address | ADDRESS OF WSD 102 | - |
| | Metric | 0 | - |
| | Originator Mesh STA Address | ADDRESS OF gateway 201 | - |

| Destination | Next Hop | First Metric |
|---|---|---|
| WSD102 | WSD102 | 20(=0+20) |

FIG.35

| PORTION | ELEMENT | SETTING VALUE | |
|---|---|---|---|
| Header | Receiver Address | ADDRESS OF gateway 201 | - |
| | Transmitter Address | ADDRESS OF WSD 103 | - |
| | Destination Address | ADDRESS OF Gateway 201 | - |
| | Source Address | ADDRESS OF WSD 103 | - |
| Body (Data) | Target Mesh STA Address | ADDRESS OF WSD 103 | - |
| | Metric | 0 | - |
| | Originator Mesh STA Address | ADDRESS OF gateway 201 | - |

| Destination | Next Hop | First Metric |
|---|---|---|
| WSD102 | WSD102 | 20 |
| WSD103 | WSD103 | 10 |

FIG.37

| PORTION | ELEMENT | SETTING VALUE |
|---|---|---|
| Header | Receiver Address | ADDRESS OF WSD 103 |
| | Transmitter Address | ADDRESS OF WSD 106 |
| | Destination Address | ADDRESS OF gateway 201 |
| | Source Address | ADDRESS OF WSD 106 |
| Body (Data) | Target Mesh STA Address | ADDRESS OF WSD 106 |
| | Metric | 0 |
| | Originator Mesh STA Address | ADDRESS OF gateway 201 |
| | ... | ... |

FIG.38

| PORTION | ELEMENT | SETTING VALUE AT RECEPTION | SETTING VALUE AT TRANSFER |
|---|---|---|---|
| Header | Receiver Address | ADDRESS OF WSD 103 | ADDRESS OF gateway 201 |
| | Transmitter Address | ADDRESS OF WSD 106 | ADDRESS OF WSD 103 |
| | Destination Address | ADDRESS OF gateway 201 | ADDRESS OF gateway 201 |
| | Source Address | ADDRESS OF WSD 106 | ADDRESS OF WSD 106 |
| Body (Data) | Target Mesh STA Address | 0 | 10 |
| | Originator Mesh STA Address | ADDRESS OF gateway 201 | ADDRESS OF gateway 201 |

| Destination | Next Hop | First Metric |
|---|---|---|
| WSD102 | WSD102 | 20 |
| WSD103 | WSD103 | 10 |
| WSD106 | WSD103 | 20 |

| Destination | Next Hop | First Metric |
|---|---|---|
| WSD102 | WSD102 | 20 |
| WSD103 | WSD103 | 10 |
| WSD105 | WSD103 | 30 |
| WSD106 | WSD103 | 20 |
| WSD108 | WSD103 | 50 |
| WSD109 | WSD103 | 30 |

FIG.41

| Command | Request Number | File Name Length | File Name | Offset | Read size |
|---|---|---|---|---|---|

FIG.42

| Command | Response Number | Result | File Data Size | File Data |
|---|---|---|---|---|

FIG.43

| Command | Request Number | File Name Length | File Name | Offset | Read size |
|---------|----------------|------------------|-----------|--------|-----------|

FIG.44

| Command | Response Number | Result | File Name Length | File Name | File Hash | Offset | File Data Size | File Data |
|---------|-----------------|--------|------------------|-----------|-----------|--------|----------------|-----------|

FIG.45

| Command | Request Number | File Name Length | File Name |
|---|---|---|---|

FIG.46

| Command | Response Number | Result | File Hash | File Name Length | File Name | File Size | Last Update | Type |
|---|---|---|---|---|---|---|---|---|

FIG.55

| FILE OWNER | Next Hop | Metric | TRANSFER PATH |
|---|---|---|---|
| WSD103 | WSD104 | 40 | WSD103→106→105→104→GW202 |
| WSD106 | WSD104 | 30 | WSD106→105→104→GW202 |
| WSD107 | WSD107 | 20 | WSD107→GW202 |
| WSD108 | WSD104 | 40 | WSD108→107→GW202 |
| WSD109 | WSD104 | 40 | WSD109→108→105→104→GW202 |

| Destination | Next Hop | Second Metric | STORAGE FREE SPACE |
|---|---|---|---|
| WSD101 | WSD102 | 120 | 32 GByte |
| WSD102 | WSD102 | 60 | 32 GByte |
| WSD104 | WSD102 | 180 | 16 GByte |
| WSD105 | WSD102 | 140 | 16 GByte |
| WSD107 | WSD102 | 192 | 64 GByte |
| WSD108 | WSD102 | 172 | 64 GByte |
| WSD109 | WSD102 | 192 | 64 GByte |
| gateway202 | WSD102 | 200 | 0 GByte |

FIG.59

| FILE OWNER | Next Hop | First Metric | FILE TYPE |
|---|---|---|---|
| WSD101 | gateway202 | 20 | Copy (BEGINNING to 50 MBytes) |
| WSD102 | WSD101 | 50 | Copy (BEGINNING to 50 MBytes) |
| WSD103 | WSD102 | 80 | Original |
| WSD107 | gateway202 | 40 | Copy (51 MBytes to END) |
| WSD108 | WSD107 | 40 | Copy (51 MBytes to END) |
| WSD109 | WSD108 | 60 | Copy (51 MBytes to END) |

STORAGE DEVICE, STORAGE SYSTEM, AND METHOD

CROSS-REFERENCE TO RELATED APPLICATIONS

This application is based upon and claims the benefit of priority from Japanese Patent Application No. 2018-174808, filed on Sep. 19, 2018; the entire contents of which are incorporated herein by reference.

FIELD

Embodiments described herein relate generally to a storage device, a storage system, and a method.

BACKGROUND

In construction of a mesh network using a wireless Local Area Network (wireless LAN), a routing protocol such as IEEE 802.11s or Routing Protocol for Low-Power and Lossy Networks (RPL) is employed.

Meanwhile, in recent years, a storage device that is capable of communicating using a wireless LAN, such as an SD memory card provided with a wireless communication device, is known.

BRIEF DESCRIPTION OF THE DRAWINGS

FIG. 5 is a diagram illustrating an example of a data configuration of a first routing table WSD according to the first embodiment;

FIG. 6 is a diagram illustrating an example of a data configuration of a first routing table of the gateway according to the first embodiment;

FIG. 8 is a diagram illustrating an example of a data configuration of a second routing table according to the first embodiment;

FIG. 9 is a diagram illustrating an example of a data structure of file information according to the first embodiment;

FIG. 23 is a diagram illustrating the Proactive Path Request before and after rewriting performed by the WSD in the first embodiment;

FIG. 24 is a diagram illustrating an example of a routing information obtained by another WSD on the basis of the Proactive Path Request in the first embodiment;

FIG. 25 is a diagram illustrating an example of a routing information obtained by the another WSD on the basis of another Proactive Path Request frame in the first embodiment;

FIG. 26 is a diagram illustrating a Proactive Path Request before and after rewriting performed by the another WSD in the first embodiment;

FIG. 27 is a diagram illustrating an example of a routing information obtained by the WSD on the basis of still another Proactive Path Request frame in the first embodiment;

FIG. 28 is a diagram illustrating an example of a routing information obtained by still another WSD on the basis of a Proactive Path Request in the first embodiment;

FIG. 29 is a diagram illustrating an example of a routing information obtained by the still another WSD on the basis of another Proactive Path Request in the first embodiment;

FIG. 30 is a diagram illustrating an example of a routing information obtained by still another WSD on the basis of the Proactive Path Request in the first embodiment;

FIG. 31 is a diagram illustrating an example of a routing information obtained by still another WSD on the basis of the Proactive Path Request in the first embodiment;

FIG. 32 is a diagram illustrating an example of a routing information obtained by still another WSD on the basis of the Proactive Path Request in the first embodiment;

FIG. 33 is a diagram illustrating a Proactive Path Reply generated and transmitted by the WSD in the first embodiment;

FIG. 34 is a diagram illustrating a first routing table of the gateway in the first embodiment;

FIG. 35 is a diagram illustrating a Proactive Path Reply generated and transmitted by the another WSD in the first embodiment;

FIG. 36 is a diagram illustrating a first routing table of the gateway in the first embodiment;

FIG. 37 is a diagram illustrating a Proactive Path Reply generated and transmitted by the still another WSD in the first embodiment;

FIG. 38 is a diagram illustrating a Proactive Path Reply before and after rewriting performed by the another WSD in the first embodiment;

FIG. 39 is a diagram illustrating a first routing table of the gateway according to the first embodiment;

FIG. 40 is a diagram illustrating a first routing table completed by the gateway according to the first embodiment;

FIG. 41 is a diagram illustrating an example of a configuration of a read request frame according to the first embodiment;

FIG. 42 is a diagram illustrating an example of a configuration of a read response frame according to the first embodiment;

FIG. 43 is a diagram illustrating an example of a configuration of a read-and-store request frame according to the first embodiment;

FIG. 44 is a diagram illustrating an example of a configuration of a read-and-store response frame according to the first embodiment;

FIG. 45 is a diagram illustrating an example of a configuration of a status request frame according to the first embodiment;

FIG. 46 is a diagram illustrating an example of a configuration of a status response frame according to the first embodiment;

FIG. 55 is a diagram illustrating a transfer path confirmed by a gateway according to a second embodiment;

FIG. 57 is a diagram illustrating a regenerated second routing table according to the third embodiment;

FIG. 59 is a diagram illustrating an owner of the file confirmed by a gateway according to the third embodiment.

DETAILED DESCRIPTION

In general, according to one embodiment, a storage device includes a wireless communication circuit, a storage, and a controller circuit. The wireless communication circuit is configured to connect to an external first device by wireless communication. The storage has a storage region. The controller circuit is configured to correct first information on the basis of a first capacity which is a free space of the storage region of the storage. The first information is numerical information indicating quality of the wireless communication with the first device. The controller circuit obtains second information being the corrected first information.

Exemplary embodiments of a storage device, a storage system, and a method will be explained below in detail with reference to the accompanying drawings. The present invention is not limited to the following embodiments.

First Embodiment (1) Configuration of Storage System
(1-1) Basic Configuration

Figure 1:
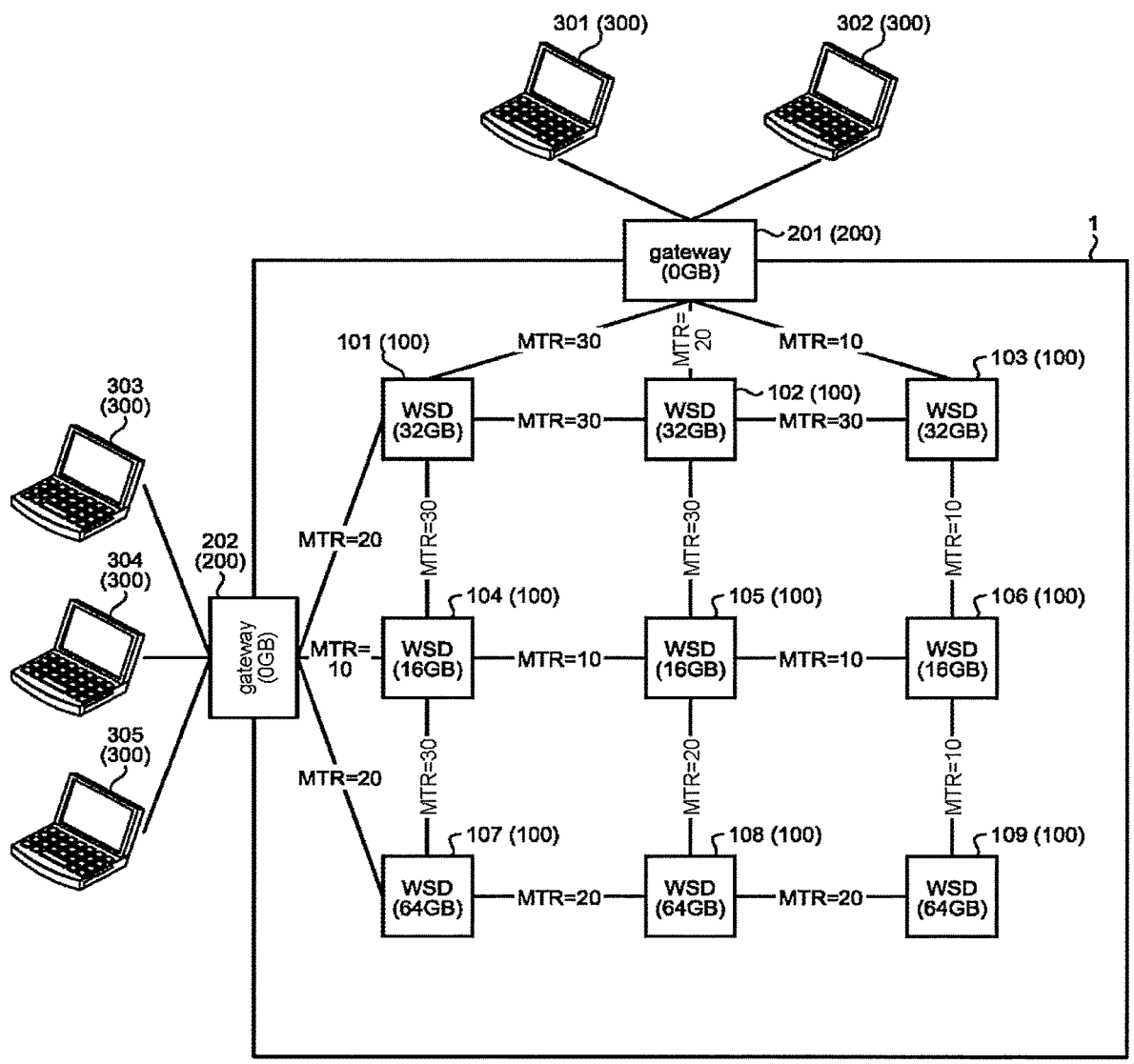
FIG. 1 is a diagram illustrating an example of a configuration of a storage system according to a first embodiment.

FIG. 1 is a diagram illustrating an example of a configuration of a storage system according to a first embodiment. A storage system 1 includes: a plurality of storage devices (wireless storage device: WSD) 100 configured to enable wireless communication; and one or more gateways 200.

FIG. 1 illustrates nine storage devices 101 to 109 as an example of the plurality of storage devices 100. FIG. 1 also illustrates two gateways 201 and 202 as an example of the one or more gateways 200.

Solid lines between the storage devices 100 and between the storage device 100 and the gateway 200 indicate wireless communication paths. The plurality of storage devices 100 and the one or more gateways 200 are wirelessly communicably connected with each other, so as to form a mesh network. In this mesh network, a portion constituted by the plurality of storage devices 100 is referred to as a storage network in some cases.

Each of the gateways 200 is wirelessly communicably connected to one or more storage devices 100 among the plurality of storage devices 100. In an example of FIG. 1, the gateway 201 is connected to the storage devices 101 to 103, while the gateway 202 is connected to the storage devices 101, 104, and 107.

A metric (MTR) is illustrated in each of the communication paths. The metric is numerical information indicating communication quality. A small metric corresponds excellent communication quality. That is, the smaller the metric, the shorter the time required for transfer.

According to IEEE 802.11s which is a standard of a mesh network using a wireless LAN, a metric "Ca1" is obtained by the following formula (1).

$$Ca1 = \left[O + \frac{Bt}{r}\right]\frac{1}{1-ef} \quad (1)$$

where, "O" is a value representing total overhead arising in communication, such as PLCP header, PLCP preamble, RTS, and CTS, in units of microseconds. "Bt" is a constant, for example 8192. "r" is a transmission PHY rate expressed in the unit of Mbps. "ef" is the frame error rate expressed in units of percent.

In the embodiment, numerical information representing communication quality is used as a first metric. An example of the first metric is numerical information obtained by formula (1). In the embodiment, a second metric is used in addition to the first metric. The second metric is obtained by correcting the first metric on the basis of the free space of a storage. Details of the second metric will be described below.

Figure 3:
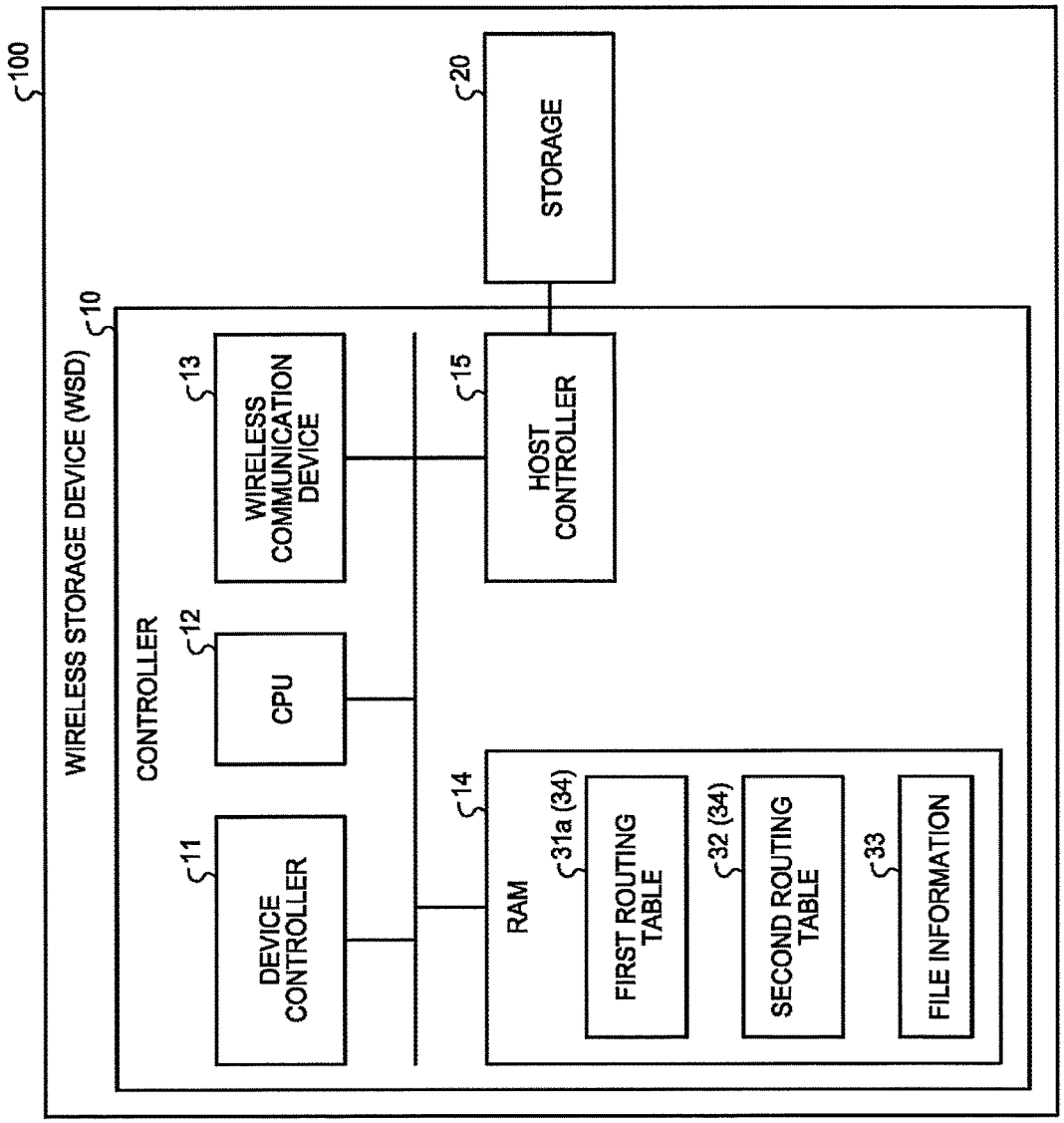
FIG. 3 is a diagram illustrating an example of a configuration of the one WSD according to the first embodiment.

In FIG. 1, each of the storage devices 100 includes illustration of free space of the storage (the storage 20 in FIG. 3). Each of the gateways 200 includes illustration of "0 GBytes" as free space of the storage.

More precisely, the free space of the storage represents a free region of a storage region capable of storing data transmitted from a user 300. Here, each of the storage devices 100 is assumed to have stored no data from the user 300 yet. That is, the free space at this time is assumed to be equal to a user capacity. The free space of the storage of each of the storage devices 100 decreases in accordance with the amount used for data storage.

Each of the gateways 200 is connected to one or more users 300 that instruct the storage system 1 to store and read data. Here, as an example, two users 300, namely, a user 301 and a user 302, are connected to the gateway 201. Three users 300, namely, users 303 to 305, are connected to the gateway 202.

An example of a user 300 is a computer. Connection from the user 300 to the gateway 200 may either be wireless connection or wired connection. The user 300 may be connected to the gateway 200 via a network hub, a router, or the like.

The user 300 transmits an instruction to a gateway 200 connected to the own user 300. The user 300 does not need to be aware of the number of storage devices 100 constituting the storage network or the network topology of the storage network.

Hereinafter, each of the gateways 200 and the storage devices 100 will be referred to as nodes in some cases. Furthermore, in a case where a certain node is focused, another node wirelessly communicably connected to the certain node will be referred to as an adjacent node in some cases. A storage device 100 will be abbreviated as a WSD 100 in some cases. Furthermore, in a case where a certain WSD 100 is focused, another WSD 100 wirelessly communicably connected to the certain WSD 100 will be referred to as an adjacent WSD 100 in some cases. In addition, "connected" means being connected so as to be able to communicate wirelessly unless otherwise specified.

In addition, when a first node generates (issues) and transmits information addressed to a second node, the first node will be denoted as an originator, an originator node, a source, or a source node. The second node will be denoted as a destination or a destination node.

In a case where the first node is not directly connected to the second node, information addressed to the second node reaches the second node via a third node. The third node is referred to as a relay node. In a case where the relay node is the WSD 100, this relay node will be denoted as a relay WSD 100.

Meanwhile, an information path from the first node to the second node will be denoted as a transfer path. Operation of transmitting and receiving information between two adjacent nodes will be denoted as transfer.

In a case where one node among two adjacent nodes transfers information to the other node, the one node will be denoted as a transfer source or a transfer source node. In this transfer, the other node will be denoted as a transfer destination or a transfer destination node.

In the following description, data from the user 300 is managed on a file basis, for example. The management of the data from the user 300 need not be performed on a file basis.

The following description is a case where a method based on 802.11s is applied as an example of a wireless communication method. The wireless communication method applicable for the technology of the embodiment is not limited to this.

The method of calculating the first metric is not limited to the method using formula (1). The formula for calculating the first metric can be modified in accordance with the standard and the purpose of use of the network.

The number of storage devices 100 constituting the storage network is not limited to nine. The number of storage devices 100 constituting the storage network may be changed statically or dynamically.

The number of gateways 200 constituting the storage system 1 is not limited to two. The number of gateways 200 constituting the storage system 1 may be changed statically or dynamically.

(1-2) Configuration of Storage Device (WSD) 100

Figure 2:
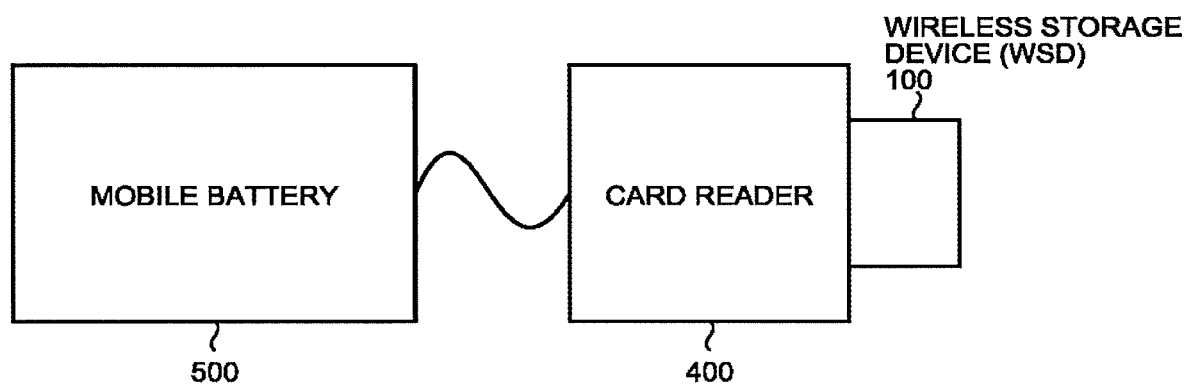
FIG. 2 is a diagram illustrating an example of an operation form of one wireless storage device (WSD) according to the first embodiment.

FIG. 2 is a diagram illustrating an example of an operation form of one WSD 100. In the present embodiment, the WSD 100 is, for example, an SD memory card having a wireless communication function.

The WSD 100 is connected to a card reader 400. The card reader 400 is connected to a mobile battery 500. The WSD 100 is driven by power supplied from the mobile battery 500 via the card reader 400. In this operation form, data input/output via the card reader 400 to the WSD 100 is not executed. The card reader 400 and the mobile battery 500 function simply as units for supplying power to the WSD 100.

For example, nine sets, each of which including the WSD 100, the card reader 400, and the mobile battery 500, are arranged so as to evenly cover one floor of one building. Accordingly, the storage network illustrated in FIG. 1 is formed.

Note that the WSD 100 is not limited to the SD memory card. Any device with wireless communication function and storage may be used as the WSD 100 of the embodiment. The units for supplying power to the WSD 100 are not limited to the above-described units. The WSD 100 may receive power in any manner.

FIG. 3 is a diagram illustrating an example of a configuration of one WSD 100. The WSD 100 includes a controller 10 and a storage 20.

The storage 20 is a storage provided in the WSD 100. That is, the storage 20 stores data received by the storage system 1 from the users 300.

The kind of the storage constituting the storage 20 is not limited to a specific kind. For example, the storage 20 may be constituted by any kind of storage such as a NAND type flash memory, a NOR type flash memory, a Resistive Random Access Memory (ReRAM), a Magnetoresistive Random Access Memory (MRAM) and a magnetic disk device. The storage 20 may be nonvolatile or nonvolatile.

The controller 10 executes: processing of transferring various requests and various responses transferred from an adjacent node to another adjacent node; processing of accessing the storage 20 in response to various requests transferred from an adjacent node; and processing of responding to various requests that have been transferred from the adjacent node. Access includes data write, data read, and data erase.

Specifically, the controller 10 includes a device controller 11, a central processing unit (CPU) 12, a wireless communication device (wireless communication circuit) 13, a random access memory (RAM) 14, and a host controller 15. The controller 10 corresponds a semiconductor integrated circuit.

The wireless communication device 13 is a communication device for performing communication using radio waves with another node. The wireless communication device 13 transmits and receives information to and from the other node in units of frames. The information transmitted and received as a frame includes data, various requests, and various responses. Processing of information is executed by the CPU 12.

The device controller 11 is an interface device for wired connection with a host. The host is a device that uses a single WSD 100 as an auxiliary storage device. The host is, for example, a digital still camera.

The device controller 11 includes a connector including a plurality of pins. The connector includes a pin for power supply in addition to input/output pins for data and input/output pins for a control signal of the WSD 100. The device controller 11 can supply the power supplied from the mobile battery 500 or the like, in a state of being converted or not being converted, to various constituent elements in the WSD 100.

In the embodiment, the WSD 100 is operated in a state where the device controller 11 is not connected to the host. It is sufficient as long as the device controller 11 is connected to a unit that supplies the power. That is, the WSD 100 according to the embodiment includes two communication units (the device controller 11/the wireless communication device 13), and performs communication, in particular, via the wireless communication device 13.

The host controller 15 is an interface device enabling access to the storage 20.

The RAM 14 is a storage that provides a function as a work area to the CPU 12. The kind of the RAM 14 is not limited to a specific type of storage. For example, the RAM 14 may be a dynamic random access memory (DRAM), a static random access memory (SRAM), or a combination of these memories.

The RAM 14 stores a first routing table 31a, a second routing table 32, and file information 33. The first routing table 31a, the second routing table 32, and the first routing table 31b to be described below are collectively referred to as a routing table 34 in some cases. Details of these pieces of information stored in the RAM 14 will be described below.

The CPU 12 is a processor capable of executing a computer program. The CPU 12 implements a function of executing firmware (firmware program) to control the WSD 100. Processing performed by the controller 10 is implemented by the CPU 12.

Note that the controller 10 may include a hardware circuit such as an application specific integrated circuit (ASIC) or a field-programmable gate array (FPGA). A part or all of the functions of controlling the WSD 100 may be implemented by this hardware circuit. That is, the functions of the controller 10 may be implemented by software, hardware, or a combination of software and hardware.

Further, the controller 10 may be configured as a System-on-a-chip (SoC). The controller 10 may be constituted by a plurality of chips.

(1-3) Configuration of Gateway 200

Figure 4:
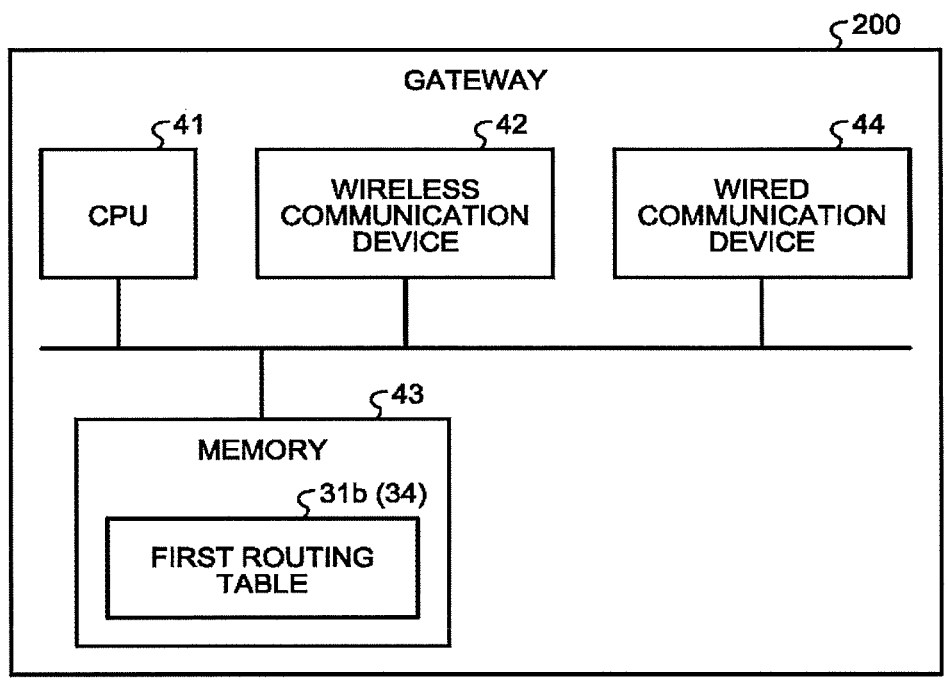
FIG. 4 is a diagram illustrating an example of a configuration of a gateway according to the first embodiment.

FIG. 4 is a diagram illustrating an example of a configuration of the gateway 200 according to the embodiment. The gateway 200 includes a CPU 41, a wireless communication device 42, a memory 43, and a wired communication device 44.

The CPU 41 implements functions of the gateway 200 on the basis of a predetermined computer program.

The wireless communication device 42 is a wireless communication device for performing communication using radio waves with other nodes or a user 300. The wired communication device 44 is a device for performing wired communication with the user 300. The gateway 200 communicates with the user 300 using the wireless communication device 42 or the wired communication device 44.

The memory 43 is constituted by a volatile memory, a nonvolatile memory, or a combination of these memories.

In the embodiment, the first routing table 31b is stored in the memory 43. Details of the first routing table 31b will be described below. The first routing table 31b and the first routing table 31a and the second routing table 32 are collectively referred to as a routing table 34 in some cases.

The gateway 200 generates a request according to an instruction from the user 300 and transmit the generated request to the destination WSD 100. A request according to an instruction from the user 300 includes a write request and a read request.

The write request is a request for causing the destination WSD 100 to store data in the storage 20 of the destination WSD 100. The read request is a request for causing the destination WSD 100 to read data from the storage 20 of the destination WSD 100 and to output the data as a response.

In an embodiment, the gateway 200 further generates and sends a read-and-store request. The read-and-store request is a request for causing the destination WSD 100 to read data from the storage 20 of the destination WSD 100 and output the data as a response and causing the WSD 100 that relays the response to store the data in the storage 20 of the own WOE) 100.

In a case where an instruction for read of identical data is issued a plurality of times, the gateway 200 determines whether to issue a read request or a read-and-store request in accordance with time interval of the instructions.

In a case where the interval f the time at which an instruction for read of certain data is issued is less than a predetermined value, the gateway 200 issues a read-and-store request for the data. In addition, in a case where the interval of the time at which the instruction for read of certain data is issued exceeds a predetermined value, the gateway 200 issues a read request for the data.

According to the read-and-store request, a duplication of the data for which a read instruction is issued is to he stored in each of relay nodes (WSD 100) on the transfer path of the response. In a case where the gateway 200 has issued a read-and-store request and thereafter further received read instruction for the data, the gateway 200 can determine a read request (or a read-and-store request) destination from among a plurality of WSDs 100 storing the data or a duplication of the data.

In a case where the instruction to read the identical data is issued with high frequency, corresponding processing would concentrate on the WSD 100 storing the data, leading to deterioration of the throughput of the storage system 1.

In the embodiment, in a case where the instruction to read the identical data is issued with high frequency, the number of the WSDs 100 storing the data is increased. This prevents concentration of processing on one WSD 100 even in a case where an instruction for the data read is issued thereafter. This configuration makes it possible to suppress deterioration of throughput in the storage system 1.

Detailed descriptions of the read-and-store request and its response will be described below.

(1-4) First Routing Tables 31a and 31b

In a mesh network, each of nodes on a transfer path from an originator to a destination needs to know a node (a transfer destination node) to which transfer subject is to be transferred among one or more connected adjacent nodes The transfer destination node among the one or more connected adjacent nodes is referred to a next hop.

The first routing tables 31a and 31b includes information indicating the next hop for achieving frame transfer with a transfer path in which the first metric (i.e. the sum of first metrics) is minimized. That is, the adjacent node constituting the transfer path achieving the minimum first metric among the one or more possible transfer paths to the destination is recorded in the first routing tables 31a and b.

FIG. 5 is a diagram illustrating an example of a data configuration of the first routing table 31a. This figure illustrates the first routing table 31a provided in the WSD 103.

As illustrated in FIG. 5, the first routing table 31a may include a plurality of records. Each of the records includes a destination node ("Destination"), a next hop ("Next Hop"), first metric ("First Metric"), and the free space of the storage 20 at the destination node. In the record in which the gateway 202 is recorded as the destination node, 0 Gbytes is set as the free space.

According to the example of FIG. 1, in a case where the destination is the gateway 202, the sum of the first metrics is "40" in the transfer path from the WSD 103 through the WSD 106, the WSD 105, and the WSD 104 in this order to reach the gateway 202. The sum of the first metrics would exceed "40" in other transfer paths.

Accordingly, as illustrated in the example of FIG. 5, the WSD 106 is recorded as the next hop and "40" is recorded as the first metric in the record of the gateway 202 of the first routing table 31a of the WSD 103.

In a case where the WSD 103 receives a frame having a destination of the gateway 202, the WSD 103 specifies the WSD 106 as the transfer destination (that is, the next hop) of the frame on the basis of the first routing table 31a illustrated in FIG. 5.

Each of the nodes determines the transfer destination on the basis of its own first routing tables 31a and 31b held. Accordingly, the transfer of the frame along a transfer path having the minimized first metric is realized.

FIG. 6 is a diagram illustrating an example of a data configuration of the first routing table 31b. This figure illustrates the first routing table 31b provided in the gateway 201. The first routing table 31b has a data structure similar to the data structure of the first routing table 31a.

That is, the first routing table 31b includes a plurality of records. Each of the records includes the destination node, the next hop, the first metric, and the free space of the storage 20 at the destination node. In the record in which the gateway 202 is recorded as the destination node, 0 Gbytes is set as the free space.

That is, the first routing table 31b has a record of a transfer destination for minimizing the first metric in transmission of information to the destination node.

The gateway 201 determines a transfer destination in accordance with the first routing table 31b illustrated in FIG. 6. This enables the frame to be transferred to, among the adjacent nodes, the node constituting the transfer path in which the first metric is minimized.

(1-5) Second Metric

The second metric is obtained by correcting the first metric on the basis of the capacity of the storage 20. For example, the second metric is obtained by the following formula (2).

$$Ca2 = Ca1 \times \frac{Sm}{Sa} \qquad (2)$$

where, "Ca1" is the first metric. "Sm" is the maximum capacity among user capacities of the WSDs 101 to 109. "Sa" is an average value of the free space of each of two adjacent nodes.

The second metric is computed using formula (2) for each of connections between two adjacent nodes. Each of numerical values described between two adjacent nodes illustrated in FIG. 7 indicates the second metric.

As a specific example, a method of obtaining the second metric between the WSD 106 and the WSD 109 will be described.

The maximum capacity among the user capacities of the WSDs 101 to 109 is assumed to be 64 [GByte] also illustrated as the free space of the WSD 107, the WSD 108, and the WSD 109, for example. Accordingly, "Sm" is 64 [GByte].

The free space of the WSD 106 is 16 [GByte], and the free space of the WSD 109 is 64 [GByte]. Accordingly, "Sa" is 40 (=(16+64)/2) [GByte].

Meanwhile, the first metric "Ca1" between the WSD 106 and the WSD 109 is 10 as illustrated in FIG. 1.

Substituting these values into the formula (2) leads to 16 (=10×64/40) obtained as the first metric "Ca2" between the WSD 106 and the WSD 109.

In this manner, the processing of calculating the second metric includes processing of dividing the first metric by the average value of sum of the free space of two adjacent nodes. Accordingly, the small second metric indicates excellent communication quality or large free space present in both the transfer source and transfer destination.

Note that formula (2) is an example of processing of correcting the first metric on the basis of the free space. The processing of correcting the first metric on the basis of the free space is not limited to this method.

For example, the second metric may be calculated by dividing the first metric by the total value of the individual free space of the two adjacent nodes. Alternatively, the second metric may be calculated by dividing the first metric by the free space of one of the two adjacent nodes. That is, the second metric can he calculated in any manner as long as the first metric is corrected on the basis of the free space.

(1-6) Second Routing Table 32

The second routing table 32 is different from the first routing tables 31a and 31b in a base metric. Although the first routing tables 31a and 31b are generated based on the first metric, the second routing table 32 is generated based on the second metric.

That is, the second routing table 32 includes information indicating the next hop for achieving frame transfer with a transfer path in which the second metric (more specifically, the sum of the second metrics) is minimized. The adjacent nodes constituting the transfer path achieving the minimum second metric among the one or more possible transfer paths to the destination are recorded in the second routing table 32.

FIG. 8 is a diagram illustrating an example of a data configuration of the second routing table 32. This figure illustrates the second routing table 32 provided in the WSD 103.

As illustrated in FIG. 8, the second routing table 32 includes a plurality of records. Each of the records includes a destination node ("Destination"), a next hop ("Next Hop"), second metric ("Second Metric"), and the free space of the storage 20 at the destination node. In the record in which the gateway 202 is recorded as the destination node, 0 Gbytes is set as the free space.

Figure 7:
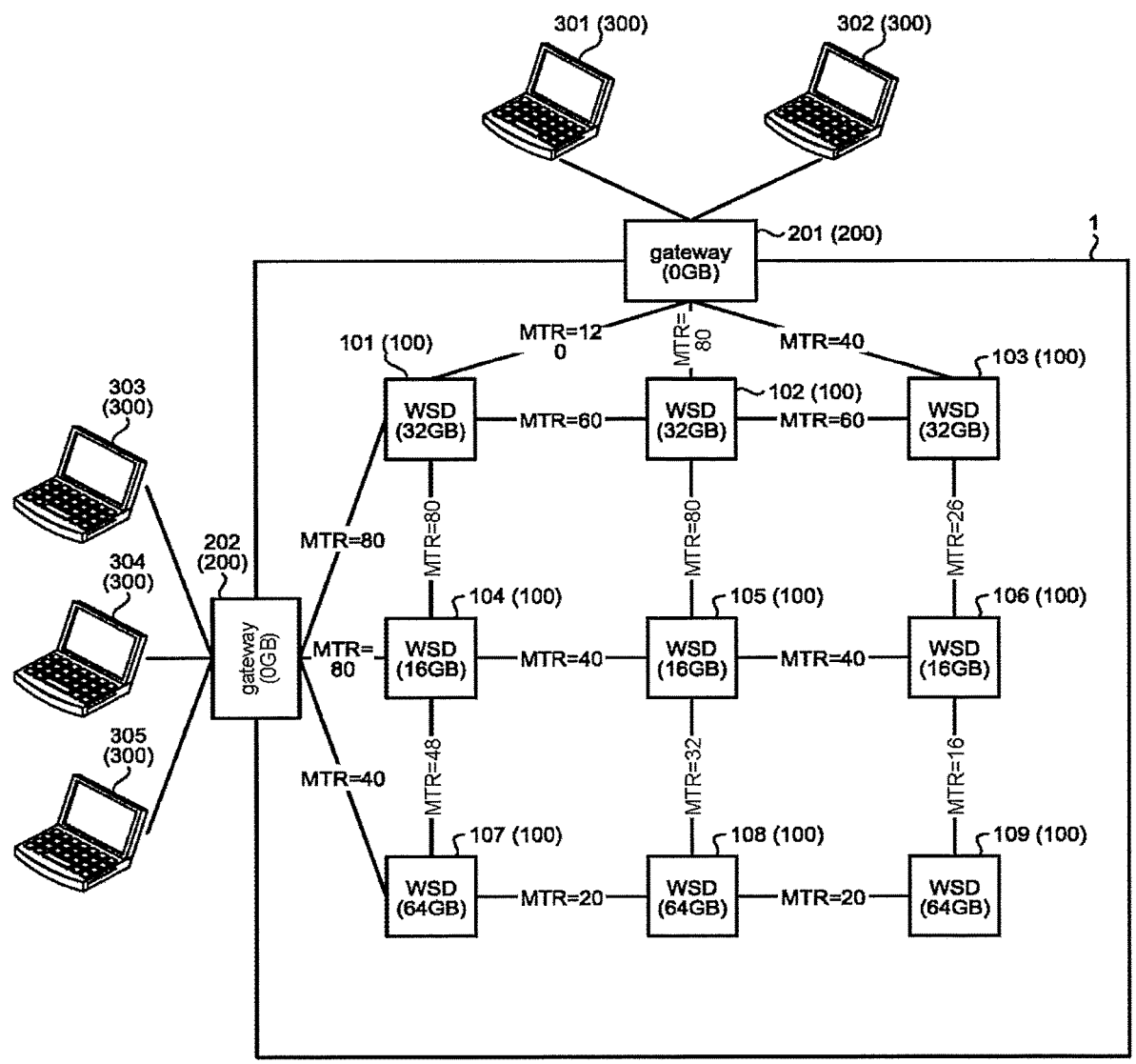
FIG. 7 is a diagram illustrating an example of a second metric between nodes according to the first embodiment.

According to the example of FIG. 7, in a case where the destination is the gateway 202, the sum of the second metrics is "122" in the transfer path from the WSD 103 through the WSD 106, the WSD 109, the WSD 108, and the WSD 107 in this order to reach the gateway 202. The sum of the second metrics would exceed "122" in other transfer paths.

Accordingly, as illustrated in the example of FIG. 8, the WSD 106 is recorded as e next hop and "122" is recorded as the second metric in the record of having the destination of the gateway 202 in the second routing table 32.

While the first routing table 31a is generated on the basis of the first metric in consideration of merely the quality of communication, the second routing table 32 is generated in consideration not merely of the communication quality but also of the free space of storages 20. Accordingly, specifying the transfer destination of a frame by using the second routing table 32 by each of the nodes would make it possible for the frame to preferentially pass through a node having large free space compared with the case of using the first routing table 31a.

For example, in a case where a frame is transferred from the WSD 103 to the gateway 202, a transfer path from the WSD 103 through the WSD 106, the WSD 105, and the WSD 104 in this order to reach the gateway 202 would he used in accordance with the first routing table 31a illustrated in FIG. 5. This transfer path is a transfer path with the best communication quality.

In contrast, according to the metric of FIG. 7 and the second routing table 32 illustrated in FIG. 8, the transfer path from the WSD 103 through the WSD 106, the WSD 109, the WSD 108, and the WSD 107 in this order to reach the gateway 202 would be used as described above. According to this transfer path, although the communication quality is lower than in the case of the transfer path when the first routing table 31a is used, it is possible to pass through the WSD 109, the WSD 108, and the WSD 107 each having large free space.

In the embodiment, the second routing table 32 is used in the transfer of the response of the read-and-store request. This makes it possible to preferentially store duplication of data in nodes with large free space. It is also possible to prevent concentration of duplications of data on a specific node on the transfer path having excellent communication quality.

In addition, the first routing tables 31a and 31b are used for transfer of other frames except for the response of the read-and-store request. This allows the frame to reach the destination with the fastest communication path.

Hereinafter, the first routing table 31a and the first routing table 31b will be collectively referred to as a first routing table 31 in some cases.

(1-7) File Information 33

Each of the WSDs 100 records a list of files stored in its own storage 20, onto file information 33.

FIG. 9 is a diagram illustrating an example of a data structure of the file information 33 held in a certain WSD 100 according to the embodiment. As illustrated in this figure, the file information 33 records file hash, file name, file size, update date and time, and file type in this order in a comma-separated values (CSV) format. For example, SHA-256 may be used as the file hash.

The file type is information indicating whether it is the original or a duplication. Regarding the file type, the original indicates data stored in accordance with a write request. In contrast, a duplication indicates data stored in accordance with a read-and-store request.

For example, from FIG. 9, concerning a file named "test1.txt", it is possible to obtain information such that the file size is "128000 Bytes", the update date and time is "20180803231214 (=23:12:14 on Aug. 3, 2018)", the file type is "original", and the file hash is "hash value #1".

(2) Operation of Storage System 1

(2-1) Frame

As described above, frames are transferred between nodes. Various requests, various responses, and various data are transferred as frames. A frame has a configuration illustrated in FIG. 10, for example.

Figure 10:
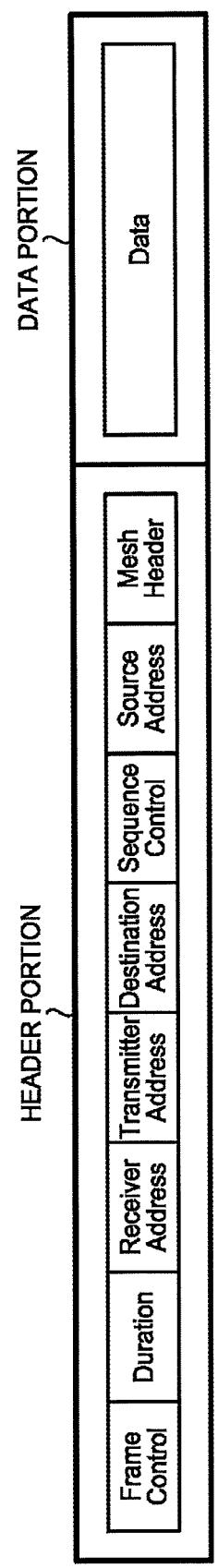
FIG. 10 is a diagram illustrating an example of a configuration of a frame according to the first embodiment.

As illustrated in FIG. 10, a frame includes a header portion and a data portion. The data portion may also be referred to as a body.

The header portion includes elements such as Frame Control, Duration, Receiver Address, Transmitter Address, Destination Address, Sequence Control, Source Address, and Mesh Header.

The frame includes a plurality of types of frames, such as a Management frame used in handshaking and a Data frame for transmission and reception of data. An ID indicating the type of a frame is set as the Frame Control element.

The Receiver Address element is an ID of the transfer destination node.

A Media Access Control (MAC) address may be used as the ID of the node, for example. Note that the ID of the node is not limited to the MAC address. Any information that identifies individual nodes may be used as the ID of the node.

The Transmitter Address element is an ID of the transfer source node.

The Destination Address element is an ID of the destination node.

The Sequence Control element is a sequence number of the frame. The sequence number is incremented by one at every transmission of a frame.

The Source Address element is an ID of the source node.

The Mesh Header element is time to live (TTL) of the frame. In order to prevent the frame from circulating indefinitely on a mesh network, an allowable upper limit of the number of hops is set as the TTL.

The data portion stores various requests and data.

The configuration illustrated in FIG. 10 is an example. The frame configuration is not limited to the configuration illustrated in FIG. 10.

(2-2) Generation of Routing Table 34

(2-2-1) Outline of Inter-Node Communication

A Proactive Path Request frame and a Proactive Path Reply frame are used to generate the routing table 34 (the first routing table 31a, the first routing table 31b, and the second routing table 32). The Proactive Path Request frame and the Proactive Path Reply frame are examples of signals for generating a transfer path.

The Proactive Path Request frame is a frame that requests search of a transfer path. The Proactive Path Reply frame is a frame that the node that received the Proactive Path Request frame transmits as a response to the Proactive Path Request frame.

Figure 11:
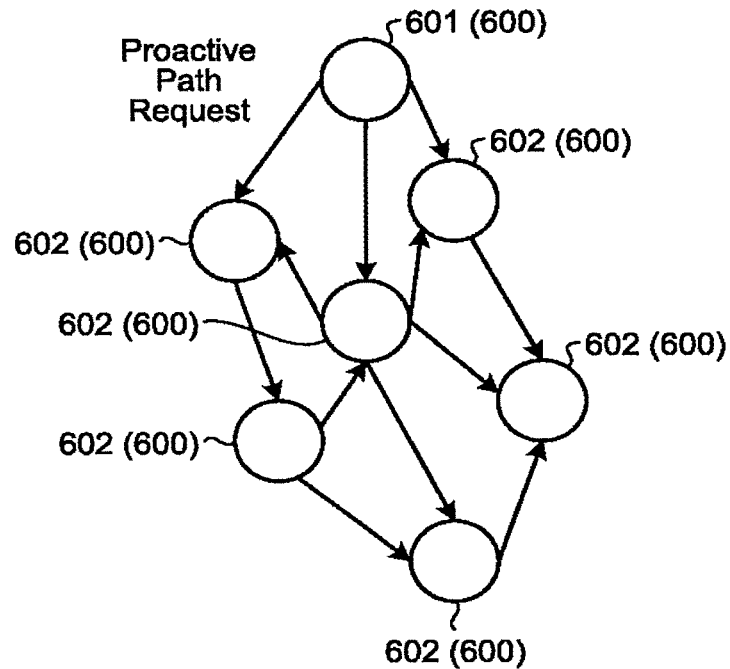
FIG. 11 is a diagram illustrating an example of transferring a Proactive Path Request frame according to the first embodiment.
Figure 12:
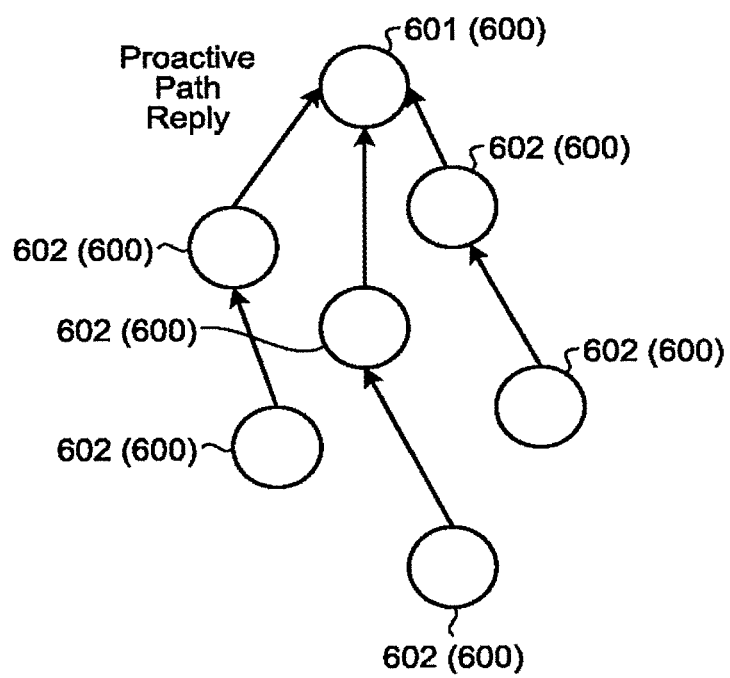
FIG. 12 is a diagram illustrating an example of transferring a Proactive Path Reply frame according to the first embodiment.

FIG. 11 is a diagram illustrating an example of transfer of the Proactive Path Request frame according to the embodiment. FIG. 12 is a diagram illustrating an example of transfer of the Proactive Path Reply frame according to the embodiment. In FIGS. 11 and 12, the node 600 is the storage device 100 or the gateway 200.

Although details will be described below, in a case where a certain node 600 (denoted as a node 601) tries to generate a routing table, the node 600 (601) generates a Proactive Path Request frame, for example. Then, the node 601 transmits the generated Proactive Path Request frame to other nodes 600 (denoted as nodes 602) in broadcast transmission, as illustrated in FIG. 11.

When a node 602 has received the Proactive Path Request frame, the node 602 performs predetermined processing on the Proactive Path Request frame and thereafter transfers the Proactive Path Request frame to another node 602.

In addition, after receiving the Proactive Path Request frame, the node 602 performs predetermined processing on the frame and thereafter generates a Proactive Path Reply frame including at least information related to the metric (the first metric or the second metric). Thereafter, as illustrated in FIG. 12, the node 602 sends the generated Proactive Path Reply frame in unicast transmission to the node 601, which is the originator of the Proactive Path Request frame.

The Proactive Path Reply frame from each of the nodes 602 is sent to the node 601 either directly or via another node 602. The node 601 aggregates information related to the metric (the first metric or the second metric) included in the Proactive Path Reply frame sent from each of the nodes 602 to generate the routing table 34.

Note that the transmission interval of the Proactive Path Request frame and the transmission timing of the Proactive Path Request frame may be arbitrarily set. In a case where it is assumed that each of nodes is moved frequently, the transmission interval of the Proactive Path Request frame may be set to a short time. In a case where it is assumed that each of nodes is fixed and would not be moved, the transmission interval of the Proactive Path Request frame may be set to a long time.

(2-2-2) Proactive Path Request

Figure 13:
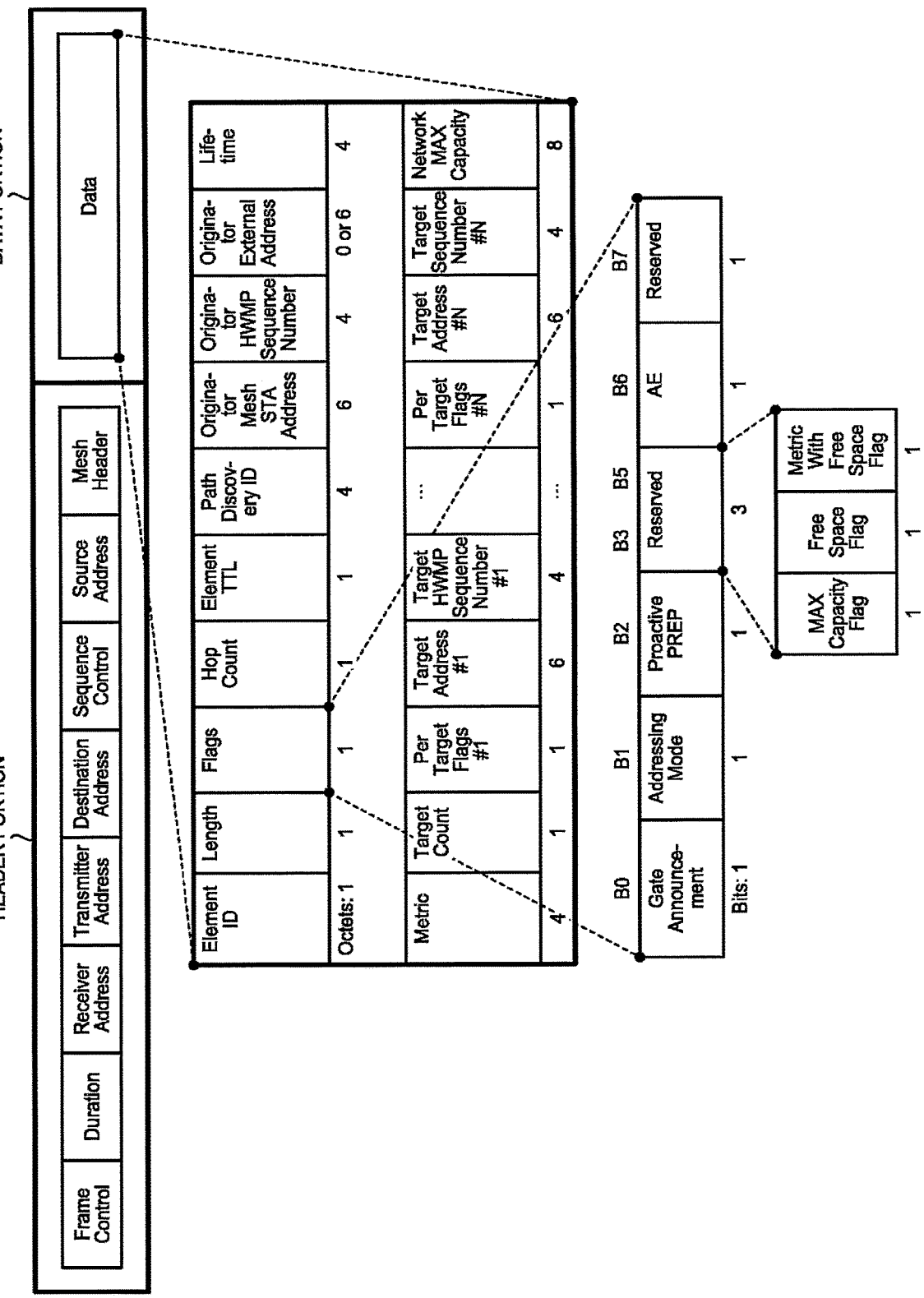
FIG. 13 is a diagram illustrating an example of a configuration of the Proactive Path Request frame according to the first embodiment.

FIG. 13 is a diagram illustrating an example of configuration of a Proactive Path Request frame according to the embodiment. In the Proactive Path Request frame in the embodiment illustrated in this figure has a configuration in which MAX Capacity Flag, Free Space Flag, Network MAX Capacity, and Metric With Free Space Flag have been added to the Reserved region of the conventional Proactive Path Request frame defined in IEEE 802.11s, for example.

The MAX Capacity Flag is a flag indicating whether description of the maximum capacity (that is, user capacity) is requested in the Proactive Path Reply frame. For example, "0" in the MAX Capacity Flag means that description of the maximum capacity is not requested. "1" in the MAX Capacity Flag means that description of the maximum capacity is requested.

The Free Space Flag is a flag indicating whether description of free space is to be requested in the Proactive Path Reply frame. For example, "0" in the Free Space Flag means that description of the free space is not requested. "1" in the Free Space Flag means that description of the free space is requested.

The Metric With Free Space Flag is a flag indicating which of the first metric and the second metric is to be requested as the metric. For example, "0" in the Metric With Free Space Flag means that the first metric is requested. "1" in the Metric With Free Space Flag indicates that a second metric is requested.

The Network MAX Capacity is a field for setting the maximum value in the maximum capacity of each of nodes (that is, the maximum value of the user capacity of each of the nodes). When the gateway 201 creates the first routing table 31b of FIG. 6, the maximum capacity of each of nodes is known. The field in which the maximum value of this maximum capacity is set corresponds to the Network MAX Capacity.

(2-2-3) Proactive Path Reply Frame

Figure 14:
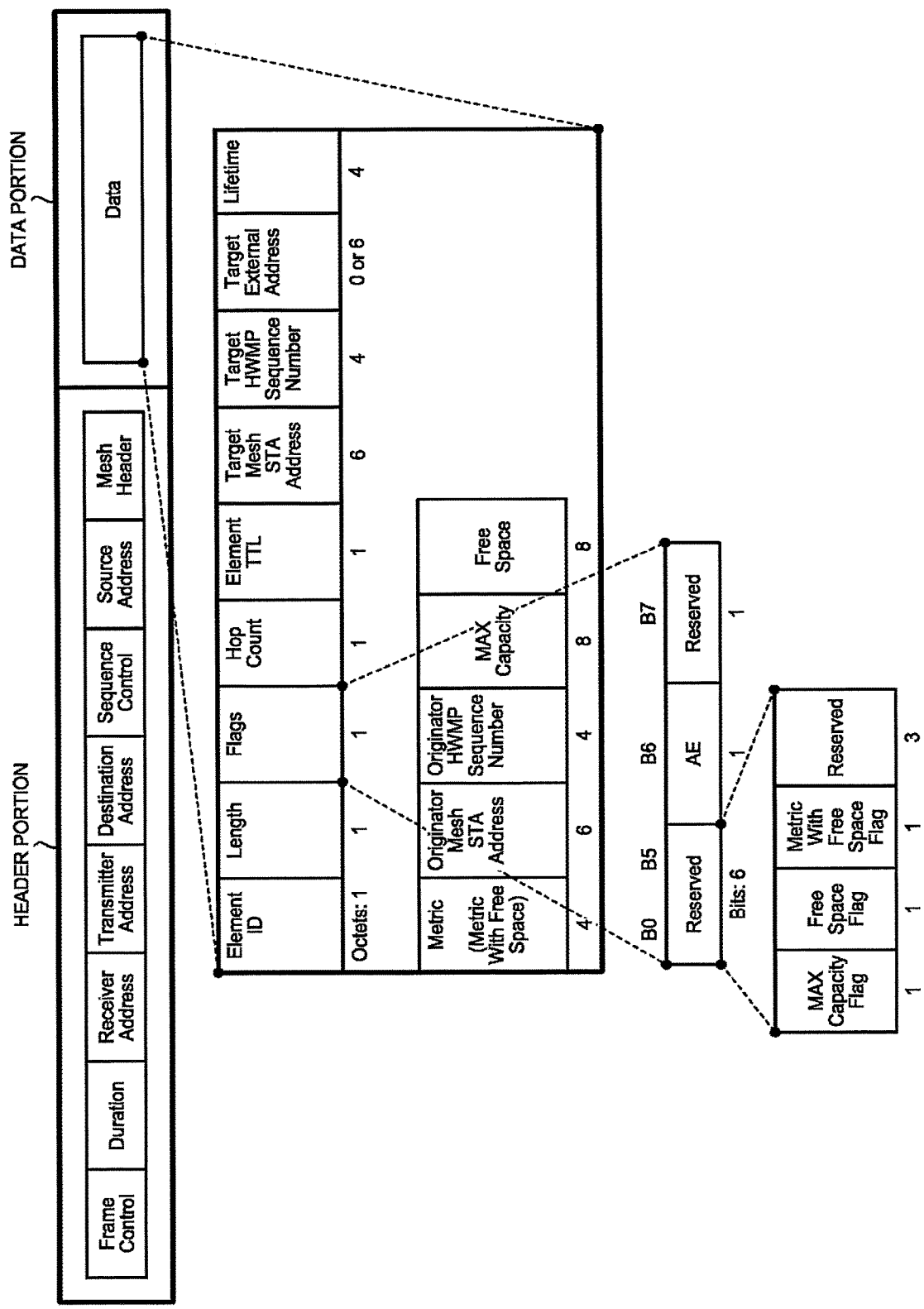
FIG. 14 is a diagram illustrating an example of a configuration of the Proactive Path Reply frame according to the first embodiment.

FIG. 14 is a diagram illustrating an example of a configuration of the Proactive Path Reply frame of the embodiment. The Proactive Path Reply frame in the embodiment illustrated in this figure has a configuration in which MAX Capacity Flag, Free Space Flag, and Metric With Free Space Flag have been added to the Reserved region present in Flags field of the conventional Proactive Path Reply frame defined in IEEE 802.11s, for example.

The MAX Capacity Flag is a flag indicating whether description of the maximum capacity (that is, user capacity) is described in the Proactive Path Reply frame. "0" in the MAX Capacity Flag means that the maximum capacity is not described. "1" in the MAX Capacity Flag means that the maximum capacity is described.

The field in which the maximum capacity is described is prepared at a position following the field in which the Originator HWMP Sequence Number is described within the Proactive Path Reply frame. That is, a MAX Capacity field illustrated in FIG. 14 is a field in which the maximum capacity is described.

The Free Space Flag is a flag indicating whether free space is described in the Proactive Path Reply frame. "0" in the Free Space Flag means that the free space is not described. "1" in the Free Space Flag means that the free space is described.

The field in which the free space is described is prepared at a position following the MAX Capacity field within the Proactive Path Reply frame. That is, the Free Space field illustrated in FIG. 14 is a field in which free space is described.

The Metric With Free Space Flag is a flag indicating which of the first metric is described and the second metric is described. "0" in the Metric With Free Space Flag means that the first metric is described. "1" in the Metric With Free Space Flag indicates that a second metric is described.

Note that the first metric or the second metric is described in the Metric field illustrated in FIG. 14.

(2-2-4) Acquisition of Free Space of Adjacent Node

In order to calculate the second metric, each of nodes needs to know the free space of an adjacent node. Each of nodes can transmit a Proactive Path Request frame in which Free Space Flag is set to 1 to obtain information of the free space of the adjacent node. In the embodiment, it is also possible, as a simpler method, to allow each of nodes to obtain the information of the free space on the basis of a beacon received from another node within a range which the radio waves of the wireless communication devices 13 and 42 reaches.

The beacon is a frame that a wireless LAN terminal periodically transmits in order to inform the surroundings of its own status in a short period (for example, interval of once every 100 milliseconds).

Figure 15:
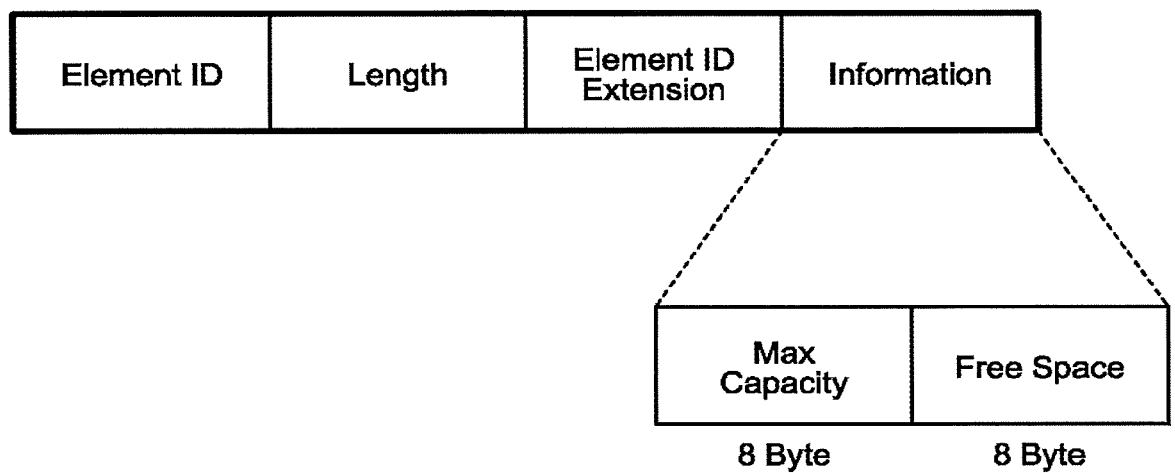
FIG. 15 is a diagram illustrating an example of a configuration of a beacon according to the first embodiment.

FIG. 15 is a diagram illustrating an example of a configuration of a beacon according to the embodiment. The conventional beacon includes an Element ID field, a Length field, an Element ID Extension field, and an Information field. The beacon of the embodiment has a configuration further including fields to enable description of MAX Capacity and Free Space in the Information field of the conventional beacon.

The maximum capacity (the user capacity) of the node that transmitted the beacon is described in the MAX Capacity field. The free space of the node that transmitted the beacon is described in the Free Space field.

Hereinafter, the maximum capacity described in the MAX Capacity field and the free space described in the Free Space field will be collectively referred to as Free Space Information element in some cases.

Figure 16:
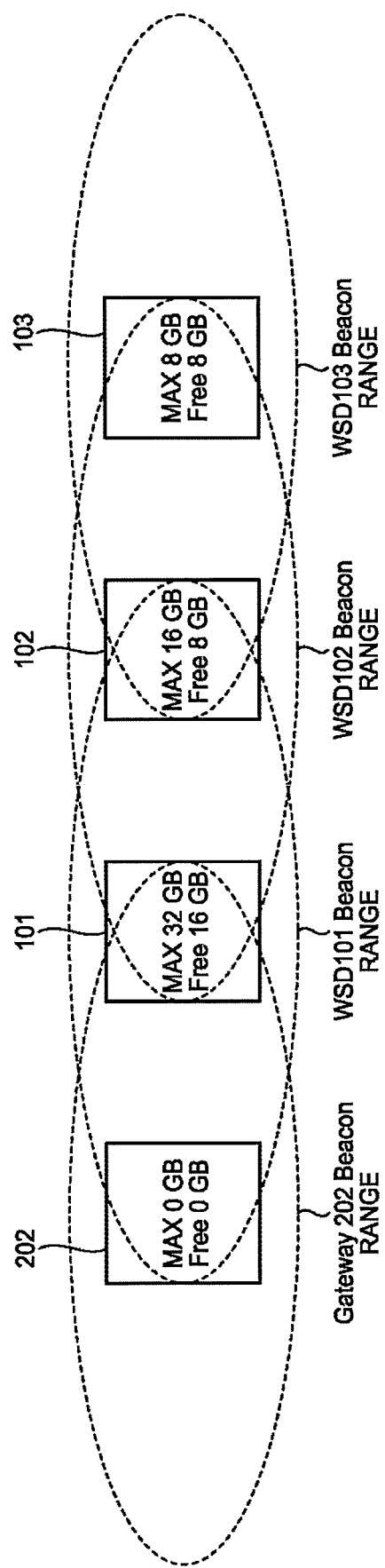
FIG. 16 is a diagram illustrating an example of operation of inter-node beacon transmission/reception according to the first embodiment.

FIG. 16 is a diagram illustrating an example of operation of inter-node beacon transmission/reception according to the embodiment. For the sake of clarification, four nodes (gateway 202, WSD 101, WSD 102, and WSD 103) are simply illustrated in this figure.

The gateway 202 learns from the Free Space Information element included in the beacon of the WSD 101 that the maximum capacity of the storage of the WSD 101 is 32 GBytes and the free space is 16 GBytes.

The WSD 101 learns from the Free Space Information element included in the beacon from the gateway 202 that the maximum capacity of the storage of the gateway 202 is 0 GBytes and the free space is 0 GBytes. Similarly, the WSD 101 learns from the Free Space Information element included in the beacon from the WSD 102 that the maximum capacity is 16 GBytes and the free space is 8 GBytes.

The WSD 102 learns from the Free pace Information element included in the beacon from the WSD 101 that the maximum capacity of the storage of the WSD 101 is 32 GBytes and the free space is 16 GBytes. Similarly, the WSD 102 learns from the Free Space Information element included in the beacon from the WSD 103 that the maximum capacity is 8 GBytes and the free space is also 8 GBytes.

The WSD 103 learns from the Free Space Information element included in the beacon from the WSD 102 that the maximum capacity of the storage of the WSD 102 is 16 GBytes and the free space is 8 GBytes.

As described above, the beacon is periodically transmitted in a short cycle. This enables each of nodes to grasp the free space of the storage of the adjacent node in substantially real time.

(2-2-5) Method of Obtaining Second Metric

Figure 17:
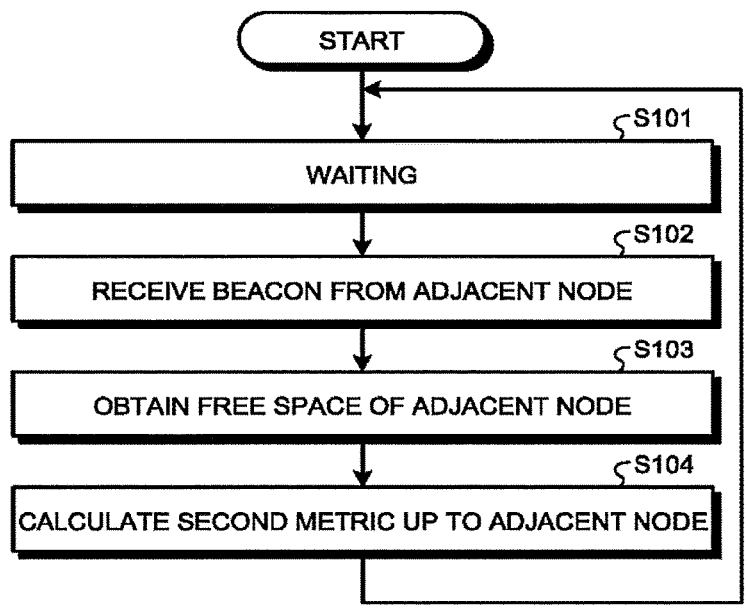
FIG. 17 is a flowchart illustrating an example of a method for obtaining the second metric in the first embodiment.

FIG. 17 is a flowchart illustrating an example of a method of obtaining the second metric according to the embodiment. A node that performs operation illustrated in this figure will be referred to as a target node. In a case where the target node is the WSD 100, the operation illustrated in this figure is executed by the controller 10. In a case where the target node is the gateway 200, the operation illustrated in this figure is executed by the CPU 41.

First, the target node waits a predetermined time (time corresponding to the beacon transmission interval) (S101). When the target node has received a beacon from an adjacent node via the wireless communication device 13 (S102), the target node obtains the free space of the storage of the adjacent node from the Free Space Information element contained in the beacon (S103).

The target node calculates a second metric to the adjacent node on the basis of the obtained free space of the storage of the adjacent node and the free space of its own storage (S104).

In S104, formula used for example. "Sm", that is, the maximum capacity among the user capacities of the WSDs 101 to 109, can be obtained with reference to the Network MAX Capacity field included in the Proactive Path Request frame of FIG. 13 periodically transmitted, or with reference to the routing table 34 or the like.

The method of obtaining the first metric. "Ca1" included in formula (2) is not limited to a specific method. The target node may obtain the first metric "Ca1" in any existing conventional method. Alternatively, the target node may obtain the first metric "Ca1" in the method according to the present embodiment or in any method to be developed in the future.

Following S104, the target node executes S101 again. Although not described here, the target node not merely receives the beacon from the adjacent node at every predetermined time but also can transmit a beacon at every predetermined time. By transmitting beacons at predetermined time intervals, the target node can notify the adjacent node of the free space of its own storage.

In this manner, in the example of FIG. 17, each of nodes calculates the second metric between the own node and source node of the beacon every time the beacon is received. Since beacons are transmitted at short intervals, each of the nodes can grasp the second metric between oneself and the source node in substantially real time.

(2-2-6) Operation of transmitting Proactive Path Request

As described above, each of nodes, when trying to generate the routing table 34, generates a Proactive Path Request and sends the generated Proactive Path Request in broadcast transmission.

Figure 18:
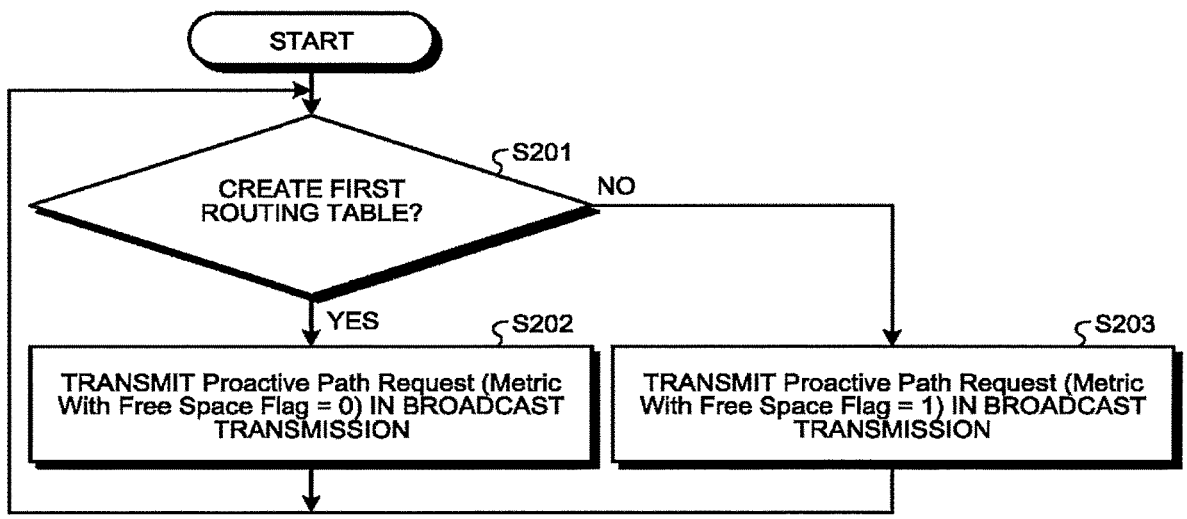
FIG. 18 is a flowchart illustrating an example of operation of transmitting the Proactive Path Request according to the first embodiment.

FIG. 18 is a flowchart illustrating an example of operation of transmitting a Proactive Path Request according to the embodiment. In the explanation shown in this figure, the source node of the Proactive Path Request is referred to as a target node. In a case where the target node is the WSD 100, the operation illustrated in this figure is executed by the controller 10. In a case where the target node is the gateway 200, the operation illustrated in this figure is executed by the CPU 41.

First, the target node determines whether to create the first routing table 31 (S201). In S201, it is determined whether the creation target is the first routing table 31 or the second routing table 32.

In a case where the target node is the gateway 200, the second routing table 32 is unnecessary, and thus, it is determined in 5201 that the first routing table 31 is to be created.

In a case where it is determined that the first routing table 31 is to be created (S201: Yes), the target node sends a Proactive Path Request having the Metric With Free Space Flag set to 0 in broadcast transmission (S202).

In a case where it is determined that the first routing table 31 is not created (S201: No), in other words, if it is determined that the second routing table 32 is to be created, the target node transmits Proactive Path Request having the Metric With Free Space Flag set to 1 in broadcast transmission (S203).

After S202 or S203, the operation of transmitting the Proactive Path Request is finished.

Note that the target node sets each of the Free Space Flag and the MAX Capacity Flag to any value out of 0 and 1 regardless of whether the creation object is the first routing table 31 or the second routing table 32. In a case where the maximum capacity is to be recorded in the routing table 34, the target node sets the MAX Capacity Flag to 1. The target node sets the Free Space Flag to 1 in a case where the free space is to be recorded in the routing table 34.

(2-2-7) Operation of Node After Receiving Proactive Path Request

Figure 19:
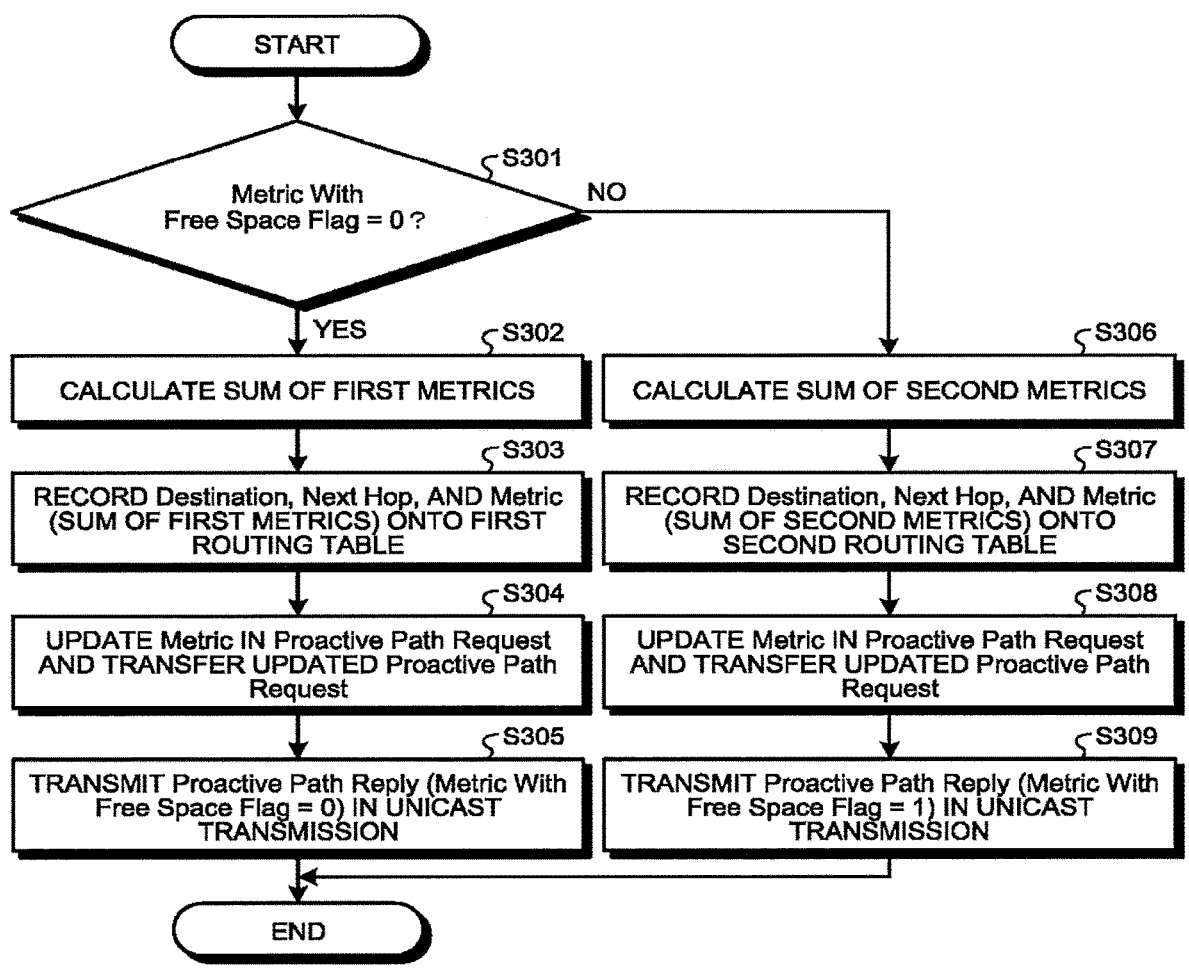
FIG. 19 is a flowchart illustrating an example of operation of a node that has received the Proactive Path Request according to the first embodiment.

FIG. 19 is a flowchart illustrating an example of operation of the node that has received the Proactive Path Request of the embodiment. In the explanation of this figure, the node that received the Proactive Path Request is referred to as a target node. In a case where the target node is the WSD 100, the operation illustrated in this figure is executed by the controller 10. In a case where the target node is the gateway 200, the operation illustrated in this figure is executed by the CPU 41.

When the target node has received the Proactive Path Request, the target node determines whether the Metric With Free Space Flag included in the Proactive Path Request is set to 0 (S301). As described above, in a case where the first metric is requested, Metric With Free Space Flag is set to 0. In a case where the second metric is requested, Metric With Free Space Flag is set to 1.

In a case where it is determined that the Metric With Free Space Flag is set to 0 (S301: Yes), the target node adds, to the value of the Metric field included in the Proactive Path Request, the first metric up to the transfer source of the Proactive Path Request (S302).

Then, the target node records the first metric obtained in S302 onto its own first routing table 31 (S303). More specifically, the target node records the address of the originator of the Proactive Path Request as "Destination", records the address of the transfer source of the Proactive Path Request as "Next Hop", and records the first metric obtained in S302 as "First Metric".

Subsequently, the target node uses the first metric obtained in S302 to update the value of the Metric field included in the Proactive Path Request, and transfers the updated Proactive Path Request in broadcast transmission (S304).

In addition, the target node transmits, in unicast transmission, Proactive Path Reply having Metric With Free Space Flag set to 0 to the node as the originator of the Proactive Path Request (S305). The target node sets 0 in the Metric field of Proactive Path Reply. The Metric field stores a value obtained by adding a metric each time a Proactive Path Reply is transferred. In S305, the initial value of 0 is stored in the Metric field.

Execution of S305 completes the operation at the target node.

In a case where it is determined that Metric With Free Space Flag is not set to 0 (S301: No), that is, in a case where Metric With Free Space Flag is set to 1, the target node adds, to the value of the Metric field included in the Proactive Path Request, the second metric up to the transfer source of Proactive Path Request (S306).

The target node obtains the second metric to each of adjacent nodes by using the operation described with reference to FIG. 17, for example. In S306, the target node uses the second metric up to a node corresponding the transfer source of the Proactive Path Request among the adjacent nodes.

Then, the target node records the second metric obtained in S306 in its own second routing table 32 (S307). More specifically, the target node records the address of the originator of the Proactive Path Request as "Destination", records the address of the transfer source of the Proactive Path Request as "Next Hop", and records the second metric obtained in S306 as "Second Metric".

Subsequently, the target node uses the second metric obtained in S306 to update the value of the Metric field included in the Proactive Path Request, and transfers the updated Proactive Path Request in broadcast transmission (S308).

In addition, the target node transmits, in unicast transmission, Proactive Path Reply having Metric With Free Space Flag set to 1 to the node as the originator of the Proactive Path Request (S309). The target node sets Metric field of Proactive Path Reply to 0, similarly to the case of S305.

The operation at the target node is completed in S309.

Although not illustrated in FIG. 19, the target node can describe the free space and the maximum capacity of its own storage in the Proactive Path Reply in accordance with the Free Space Flag and the MAX Capacity Flag included in the Proactive Path Request.

Specifically, in a case where the Free Space Flag of the Proactive Path Request is set to 1, the target node describes the free space of its own storage in the Free Space field of the Proactive Path Reply. In that case, the target node sets the Free Space Flag of Proactive Path Reply to 1.

Moreover, in a case where the Free Space Flag of the Proactive Path Request is set to 0, the target node would not describe the free space of its own storage in the Free Space field of the Proactive Path Reply. In that case, the target node sets the Free Space Flag of Proactive Path Reply to 0.

In a case where the MAX Capacity Flag of the Proactive Path Request is set to 1, the target node describes the maximum capacity of its own storage in the MAX Capacity field of Proactive Path Reply. In that case, the target node sets he MAX Capacity Flag of Proactive Path Reply to 1.

Moreover, in a case where the MAX Capacity Flag of the Proactive Path Request is set to 0, the target node would not describe the maximum capacity of its own storage in the MAX Capacity field of Proactive Path Reply. In that case, the target node sets MAX Capacity Flag of Proactive Path Reply to 0.

(2-2-8) Operation of Node After Receiving Proactive Path Reply

Figure 20:
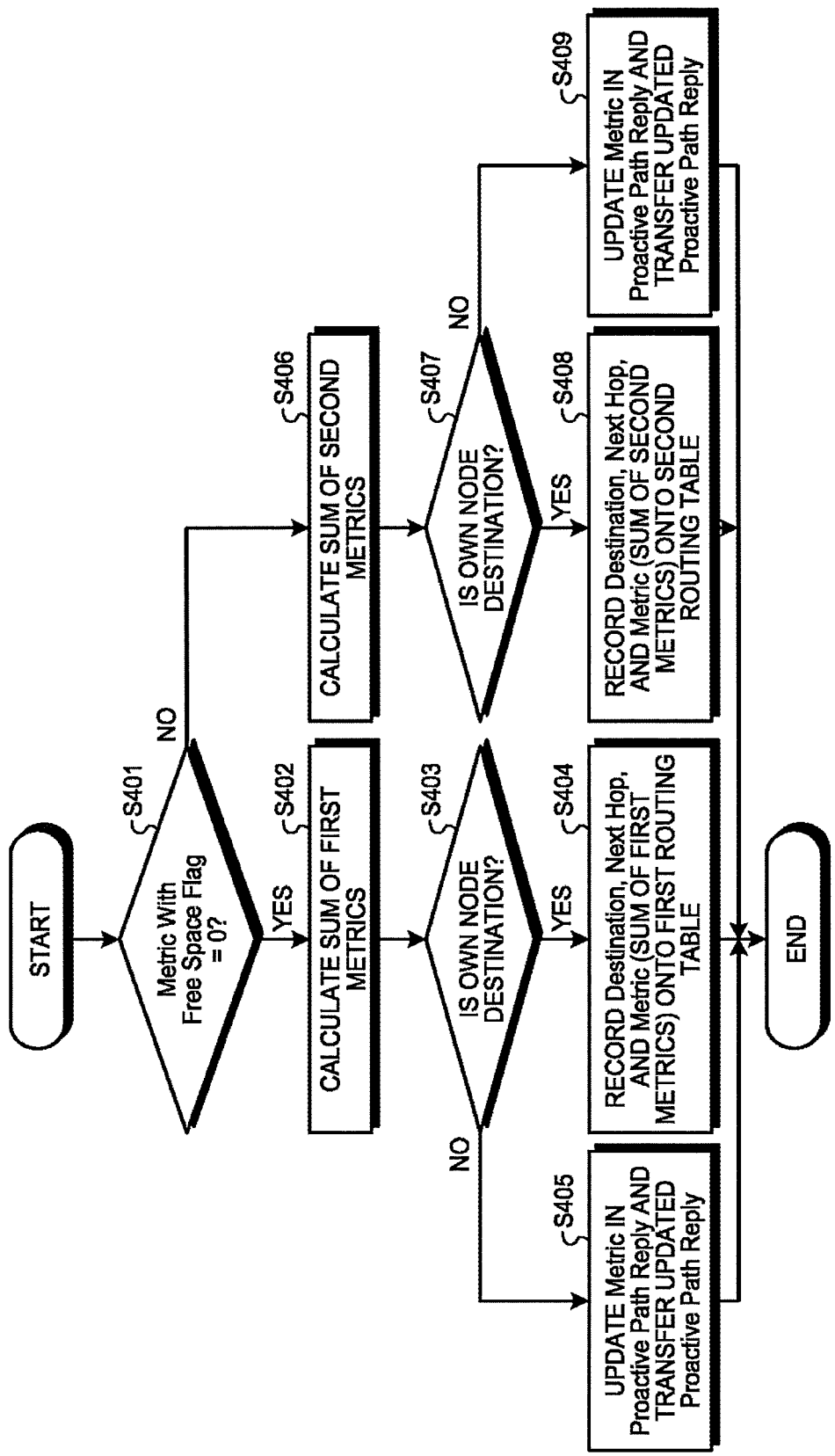
FIG. 20 is a flowchart illustrating an example of operation of a node that has received the Proactive Path Reply according to the first embodiment.

FIG. 20 is a flowchart illustrating an example of operation of the node that has received the Proactive Path Reply. In the explanation of this figure, the node that received the Proactive Path Reply is referred to as a target node. In a case where the target node is the WSD 100, the operation illustrated in this figure is executed by the controller 10. In a case where the target node is the gateway 200, the operation illustrated in this figure is executed by the CPU 41.

When the target node has received the Proactive Path Reply, the target node determines whether the Metric With Free Space Flag included in the Proactive Path Reply is set to 0 (S401). As described above, in a case where the first metric is requested, the Metric With Free Space Flag is set to 0. In a case where the second metric is requested, the Metric With Free Space Flag is set to 1.

In a case where it is determined that Metric With Free Space Flag is set to 0 (S401: Yes), the target node adds, to the value of the Metric field included in the Proactive Path Reply, the first metric up to the transfer source of the Proactive Path Reply (S402).

Then, the target node determines whether the own node is the destination of the Proactive Path Reply (S403).

In a case where it is determined that the own node is the destination of the Proactive Path Reply (S403: Yes), the target node records the first metric obtained in S402 in its own first routing table 31 (S404). More specifically, the target node records the address of the originator of the Proactive Path Reply as "Destination", records the address of the transfer source of the Proactive Path Reply as "Next Hop", and records the first metric obtained in S402 as "First Metric".

In a case where it is determined that the own node is not the destination of the Proactive Path Reply (S403: No), the target node uses the first metric obtained in S402 to update the value of the Metric field included in the Proactive Path Reply, and transfers updated Proactive Path Reply in unicast transmission (S405). In S405, the first routing table 31 is referred to during transfer.

In a case where it is determined that the Metric With Free Space Flag is not set to 0 (S401: No), that is, in a case where the Metric With Free Space Flag is set to 1, the target node adds, to the value of the Metric field included in the Proactive Path Reply, the second metric up to the transfer source of Proactive Path Reply (S406).

Then, the target node determines whether the own node is the destination of the Proactive Path Reply (S407).

In a case where it is determined that the own node is the destination of Proactive Path Reply (S407: Yes), the target node records the second metric obtained in S406 in its own second routing table 32 (S408). More specifically, the target node records the address of the originator of the Proactive Path Reply as "Destination", records the address of the transfer source of the Proactive Path Reply as "Next Hop", and records the second metric obtained in S406 as "Second Metric".

In a case where it is determined that the own node is not the destination of the Proactive Path Reply (S407: No), the target node uses the second metric obtained in S406 to update the value of the Metric field included in the Proactive Path Reply, and transfers updated Proactive Path Reply in unicast transmission (S409). In S409, the second routing table 32 is referred to during transfer.

Execution of S405, S406, S406, or S409 completes the operation at the target node.

In a case where the target node is a destination of the Proactive Path Reply (S403: Yes or S407: Yes) and in a case where the free space or the maximum capacity is described in the Proactive Path Reply, in S404 or S408, the target node may record the free space and or maximum capacity onto the routing table 34. This enables the target node to obtain the routing table 34 in which the free space and the maximum capacity are recorded for each of nodes.

(2-2-9) Specific Example of Generation Method of Routing Table 34

The series of operation illustrated in FIGS. 18 to 20 is executed. Accordingly, the routing table 34 specified by the processing of S201 is generated at the node as the source of the Proactive Path Request frame.

Here, as a specific example of the method of generating the routing table 34, a method of generating the first routing table 31 will be described. The method of generating the second routing table 32 is different from the method of generating the first routing table 31 in terms of the metric used. The following specific example of the method of generating the first routing table 31 is considered as a specific example of the generation method of the second routing table 32 by replacing the first metric with the second metric.

Figures 21, 22:
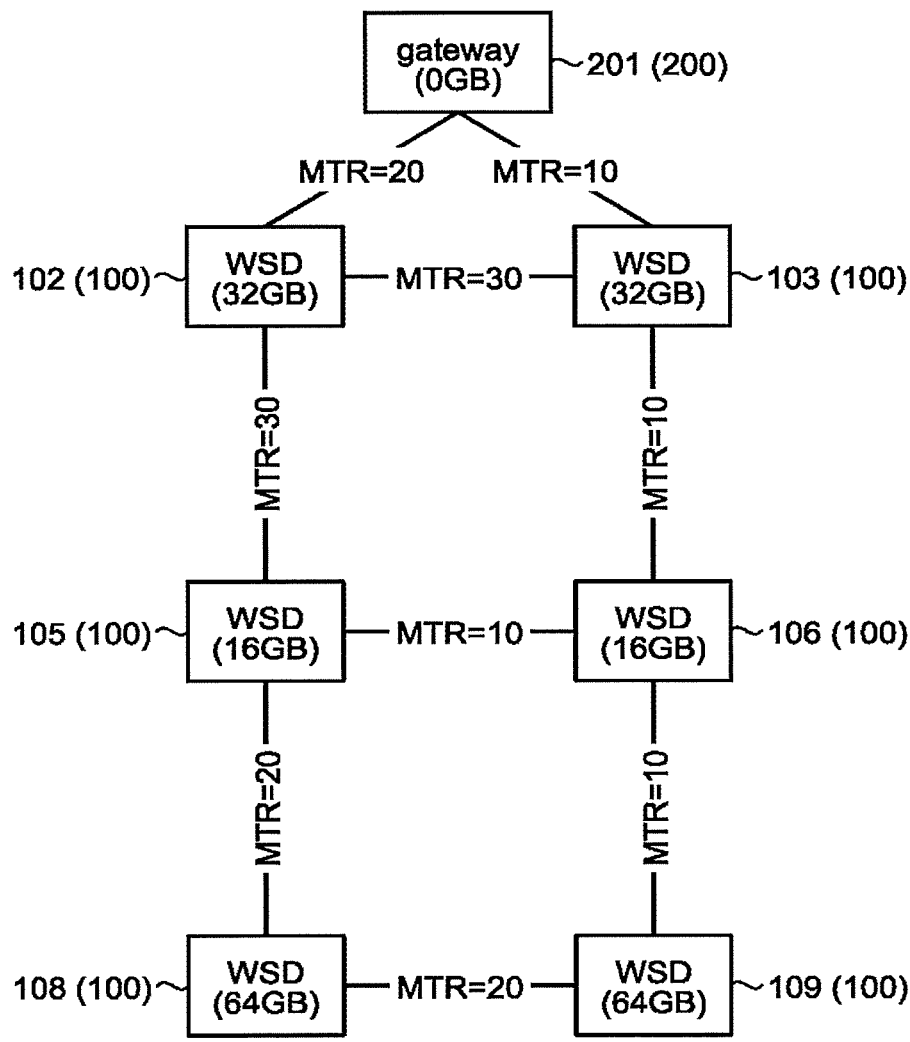
FIG. 21 is a diagram illustrating an example of inter-node connection according to the first embodiment.
FIG. 22 is a diagram illustrating an example of a routing information obtained by a WSD on the basis f the Proactive Path Request frame in the first embodiment.

For the sake of simplification, a case where the gateway 201 generates the first routing table 31*b* in a network including the gateway 201, the WSD 102, the WSD 103, the WSD 105, the WSD 106, the WSD 108, and the WSD 109 as illustrated in FIG. 21 will be described.

First, the gateway 201 transmits Proactive Path Request in broadcast transmission. This Proactive Path Request has the MAC address of the gateway 201 set as the Originator Mesh STA Address element, and has the Metric element set to 0.

When the WSD 102 has received the Proactive Path Request from the gateway 201, the WSD 102 obtains the Originator Mesh STA Address element as "Destination", obtains the Transmitter Address element as "Next Hop", and obtains 20 (=0+20) as a result of adding, to the Metric element (0), the first metric (20) up to the gateway 201 preliminarily obtained by the WSD 102, as "First Metric".

Hereinafter, the information obtained from the Proactive Path Request frame by the node that has received the Proactive Path Request frame will he referred to as routing information.

FIG. 22 is a diagram illustrating an example of routing information obtained by the WSD 102 on the basis of the Proactive Path Request frame. As illustrated in the figure, the routing information has a record of the gateway 201 as "Destination", a record of the gateway 201 as "Next Hop", and a record of 20 as "First Metric". The WSD 102 adds this routing information to the first routing table 31*a* of the WSD 102 as one record.

The WSD 102 has received the Proactive Path Request in broadcast transmission, and subsequently transfers this Proactive Path Request, while rewriting two portions of the Proactive Path Requests at the time of transfer. FIG. 23 is a diagram illustrating the Proactive Path Request before and after being rewritten by the WSD 102.

As illustrated in FIG. 23, the WSD 102 rewrites the Transmitter Address element and the Metric element. The WSD 102 rewrites the Transmitter Address element from the address (MAC address) of the gateway 201 to the address address) of the WSD 102. Also, the WSD 102 rewrites the Metric element from 0 to the 20 as a first metric recorded in the routing information.

After the WSD 103 has received the Proactive Path Request from the gateway 201, the WSD 103 generates routing information. That is, the WSD 103 obtains the Originator Mesh STA Address element as "Destination", obtains the Transmitter Address element as "Next Hop", and obtains 10 (=0+10) as a result of adding, to the Metric element (0), the first metric (10) up to the gateway 201 preliminarily obtained by the WSD 103, as "First Metric".

FIG. 24 is a diagram illustrating an example of routing information obtained by the WSD 103 on the basis of the Proactive Path Request. As illustrated in the figure, the routing information has a record of the gateway 201 as "Destination", a record of the gateway 201 as "Next Hop", and a record of 10 as "First Metric". The WSD 103 adds this routing information to the first routing table 31*a* of the WSD 103 as one record.

Here, the WSD 103 may receive the Proactive Path Request transmitted from the gateway 201 via the WSD 102.

As described with reference to FIG. 23, the Transmitter Address element and the Metric element have been rewritten in the Proactive Path Request that has passed through the WSD 102. The WSD 103 generates the routing information illustrated in FIG. 25 from the Proactive Path Request after the Transmitter Address element and the Metric field element have been rewritten.

According to the routing information illustrated in FIG. 25, the sum of the first metric (20) between the gateway 201 and the WSD 102 and the first metric (30) between the WSD 102 and the WSD 103 is recorded as "First Metric". That is, the routing information illustrated in FIG. 25 has recorded the first metric (50) as the sum of the transfer paths of the Proactive Path Request that has passed through the WSD 102.

The WSD 103 compares the first metric (sum of the first met between the routing information of FIG. 24 and the routing information of FIG. 25, and discards the routing information having the larger first metric (sum of the first metrics), that is, discards the routing information in FIG. 25.

This configuration enables the WSD 103 to selectively store the routing information obtained from the Proactive Path Request transferred from the path having better communication quality among the two transfer paths from the gateway 201 to the WSD 103, that is, selectively store the routing information in FIG. 24, as a record in which the gateway 201 is set as "Destination".

The WSD 103 rewrites the Proactive Path Request received directly from the gateway 201 on the basis of the routing information that has remained without being discarded, that is, the routing information in FIG. 24, and transfers the rewritten Proactive Path Request.

FIG. 26 is a diagram illustrating the Proactive Path Request before and after being rewritten by the WSD 103. As illustrated in this figure, the W D 103 rewrites the Transmitter Address element and the Metric element. The WSD 103 rewrites the Transmitter Address element from the address (MAC address) of the gateway 201 to the address (MAC address) of the WSD 103. The WSD 103 further rewrites the Metric element from 0 to 10, which is the first metric (sum of the first metrics) obtained as the routing information illustrated in FIG. 22.

Note that the WSD 103 can execute rewrite and transfer of the first received Proactive Path Request among the two Proactive Path Requests transferred along different transfer paths without a need to wait for reception of the remaining Proactive Path Request among the two Proactive Path Requests. The Proactive Path Request received first among the two Proactive Path Requests has been transferred by the transfer path having better communication quality than the remaining Proactive Path Request among the two Proactive Path Requests, and thus, it is clear that the sum of the first metrics regarding the first received Proactive Path Request is smaller than the sum of the first metrics regarding the remaining one.

While the WSD 103 executes rewrite and transfer of the first received Proactive Path Request among the two Proactive Path Requests, the WSD 103 would not execute rewrite or transfer of the remaining Proactive Path Request among the two Proactive Path Requests. This enables the WSD 103 to selectively transfer the Proactive Path Request transferred by the transfer path with the highest communication quality to another node.

In addition, this enables the WSD 103 to generate a corresponding record in the first routing table 31a on the basis of the Proactive Path Request transferred by the transfer path with the highest communication quality.

Similarly to the case of the WSD 103, the WSD 102 may receive the Proactive Path Request transmitted from the gateway 201 via the WSD 103. The WSD 102 generates the routing information illustrated in FIG. 27 on the basis of the Proactive Path Request transmitted from the gateway 201. However, the routing information illustrated in FIG. 27 has a larger metric value as compared with the routing information illustrated in FIG. 22 which has already been generated and held. Accordingly, the WSD 102 deletes the routing information illustrated in FIG. 27. In addition, the WSD 102 would not rewrite and transfer the Proactive Path Request received via the WSD 103.

This enables the WSD 102 to selectively transfer the Proactive Path Request transferred by the transfer path with the highest communication quality to another node. In addition, this enables the WSD 102 to generate a corresponding record in the first routing table 31a of the WSD 102 on the basis of the Proactive Path Request transferred by the transfer path with the highest communication quality.

The WSD 105 may receive the Proactive Path Request via the WSD 102. The Proactive Path Request that has reached the WSD 105 via the WSD 102 is a Proactive Path Request after being rewritten by the WSD 102, as illustrated in FIG. 23. The WSD 105 generates the routing information illustrated in FIG. 28 on the basis of the Proactive Path Request after being rewritten by the WSD 102. As illustrated in FIG. 28, the routing information has recorded 50, which is the sum of the first metrics of the path through which the Proactive Path Request has been transferred.

In addition, the WSD 105 may receive the Proactive Path Request transferred through the WSD 103 and the WSD 106. The Proactive Path Request that has passed through the WSD 103 and the WSD 106 in this order to reach the WSD 105 has the value of the Transmitter Address field being rewritten by the WSD 106 to the address (MAC address) of the WSD 106, and has the value of the Metric field being rewritten by the WSD 106 to 20, namely, the sum of the first metrics of the transfer path from the gateway 201 through the WSD 103 to the WSD 106. The WSD 105 generates the routing information illustrated in FIG. 29 on the basis of the Proactive Path Request after being rewritten by the WSD 106. As illustrated in FIG. 29, 30, which is the sum of the first metrics of the path through which the Proactive Path Request has been transferred, is recorded in the routing information.

Among the routing information illustrated in FIG. 28 and the routing information illustrated in FIG. 29, the first metric (sum of the first metrics) recorded in the routing information illustrated in FIG. 29 is smaller than the first metric recorded in the other. Therefore, the WSD 105 executes rewrite and transfer of the Proactive Path Request that has reached the WSD 105 via the WSD 103 and the WSD 106, without executing rewrite and transfer of the Proactive Path Request frame that has reached the WSD 105 via the WSD 102. In addition, the WSD 105 adds the routing information illustrated in FIG. 29 to the first routing table 31a of the WSD 105 as one record, and discards the routing information illustrated in FIG. 28.

In this manner, each of nodes executes rewrite and transfer of Proactive Path Request transferred through the transfer path having the smallest sum of first metrics among a plurality of Proactive Path Requests transmitted in broadcast transmission from the gateway 201 and transferred by individually different transfer paths. Each of the nodes subsequently generates one record of the first routing table 31a on the basis of the transfer path having the smallest sum of first metrics.

For reference, routing information generated at other nodes and being to he added to the first routing table 31a are illustrated. FIG. 30 illustrates routing information of the WSD 106. FIG. 31 illustrates routing information of the WSD 108. FIG. 32 illustrates routing information of the WSD 109.

After reception of the Proactive Path Request, each of the nodes executes rewrite and transfer of the Proactive Path Request, and together with this, transmits, in unicast transmission, a Proactive Path Reply to the address described in the Originator Mesh STA Address of the Proactive Path Request, that is, to the gateway 201, as the destination.

FIG. 33 is a diagram illustrating a Proactive Path Reply generated and transmitted by the WSD 102. The WSD 102 learns, on the basis of the routing information (first routing table 31a) illustrated in FIG. 22, that the next hop is the gateway 201 in a case where the destination is the gateway 201. The WSD 102 next sets the address of the gateway 201 as the Originator Mesh STA Address element to the Proactive Path Reply, sets the address of its own node (WSD 102) as the Target Mesh STA Address element, sets 0 as the Metric element, sets the address of its own node (WSD 102) as the Source Address element of the header portion, and sets the address of the gateway 201 as the Destination Address element. The WSD 102 transfers, to the gateway 201 being the next hop, the Proactive Path Reply having these pieces of information being set.

When the gateway 201 has received the Proactive Path Reply transferred from the WSD 102, the gateway 201 obtains the Target Mesh STA Address element as "Destination", obtains the Transmitter Address element as "Next Hop", and obtains 20 (=0+20) as a result of adding, to the Metric element (0), the first metric (20) up to the WSD 102 preliminarily obtained by the gateway 201, as "First Metric".

Subsequently, the gateway 201 adds these obtained values as one record to the first routing table 31b. FIG. 34 is a diagram illustrating the first routing table 31b of the gateway 201 generated by the above procedure.

FIG. 35 is a diagram illustrating Proactive Path Reply generated and transmitted by the WSD 103. The WSD 103 learns, on the basis of the routing information (first routing table 31a) illustrated in FIG. 24, that the next hop is the gateway 201 in a case where the destination is the gateway 201 The WSD 103 next sets the address of the gateway 201 as the Originator Mesh STA Address element to the Proactive Path Reply, sets the address of its own node (WSD 103) as the Target Mesh STA Address element, sets 0 as the Metric element, sets the address of its own node (WSD 103) as the Source Address element of the header portion, and sets the address of the gateway 201 as the Destination Address element. The WSD 103 transfers the Proactive Path Reply having these pieces of information being set, to the gateway 201 being the next hop.

When the gateway 201 has received the Proactive Path Reply transferred from the WSD 103, the gateway 201 obtains the Target Mesh STA Address element as "Destination", obtains the Transmitter Address element as "Next Hop", and obtains 10 (=0+10) as a result of adding, to the Metric element (0), the first metric (10) up to the WSD 103 preliminarily obtained by the gateway 201, as "First Metric".

Subsequently, the gateway 201 adds these obtained values as one record to the first routing table 31b. FIG. 36 is a diagram illustrating the first routing table 31b of the gateway 201 generated by the above procedure.

FIG. 37 is a diagram illustrating Proactive Path Reply generated and transmitted by the WSD 106. The WSD 106 learns, on the basis of the routing information (first routing table 31a) illustrated in FIG. 30, that the next hop is the WSD 103 in a case where the destination is the gateway 201. The WSD 106 next sets the address of the gateway 201 as the Originator Mesh STA Address element to the Proactive Path Reply, sets the address of its own node (WSD 106) as he Target Mesh STA Address element, sets 0 as the Metric element, sets the address of its own node (WSD 106) as the Source Address element of the header portion, and sets the address of the gateway 201 as the Destination Address element. The WSD 106 transfers Proactive Path Reply having these pieces of information being set, to the WSD 103 being the next hop.

After the WSD 103 receives the Proactive Path Reply illustrated in FIG. 37 from the WSD 106, the WSD 103 confirms the Destination Address of the header portion. This enables the WSD 103 to learn that the destination of the Proactive Path Reply is not the WSD 103. The WSD 103 learns, on the basis of the routing information (first routing table 31a) illustrated in FIG. 24, that the next hop is the gateway 201 in a case where the destination is the gateway 201. Then the WSD 103 rewrites the Proactive Path Reply.

FIG. 38 is a diagram illustrating Proactive Path Reply before and after being rewritten by the WSD 103.

As illustrated in FIG. 38, the WSD 103 rewrites the Receiver Address element and the Transmitter Address element of the header portion and the Metric element of the data portion. Specifically, the WSD 103 rewrites the Receiver Address element from the address of its own node (WSD 103) to the address of the transfer destination (gateway 201), and rewrites the Transmitter Address element from the address of the WSD 106 to the address of its own node (WSD 103). The WSD 103 further obtains 10 (=0+10) resulted from adding, to the Metric element (0), the first metrics (10) up to the WSD 106 preliminarily obtained by the WSD 103, and rewrites the Metric element to the value resulted from the adding.

The WSD 103 transfers the rewritten Proactive Path Reply to the gateway 201 being the next hop.

When the gateway 201 has received the Proactive Path Reply transferred from the WSD 106 via the WSD 103, the gateway 201 obtains the Target Mesh STA Address element as "Destination", obtains the Transmitter Address element as "Next Hop", and obtains, as "First Metric," 20 (=10+10) resulted from adding, to the Metric element (10), the first metric (10) up to the WSD 103 preliminarily obtained by the gateway 201.

Subsequently, the gateway 201 adds these obtained values as one record to the first routing table 31b. FIG. 39 is a diagram illustrating the first routing table 31b of the gateway 201 generated by the above procedure.

In this manner, in a case where the destination of the Proactive Path Reply is not the own node, the node that has received the Proactive Path Reply adds, to the Metric element, the first metrics up to the transfer source of the Proactive Path Reply frame. Then the node updates the Metric element by using the value obtained by the adding. The node transfers the updated Proactive Path Reply in accordance with the first routing table 31.

With this procedure, the Proactive Path Reply is transferred along the transfer path having the smallest sum of the first metrics, and reaches the destination, that is, the source of the Proactive Path Request frame.

In addition, the relay node and the destination node of the Proactive Path Reply (namely, the gateway 201) add, to the Metric element, the first metrics up to the transfer source. This enables the destination of the Proactive Path Reply to obtain the sum of the first metrics of the transfer path of the Proactive Path Reply.

With operation similar to the above, each Proactive Path Reply generated and transmitted by the WSD 105, the WSD 108, and the WSD 109 is transferred in accordance with the first routing table 31a. The first metric is added to the Metric element of each Proactive Path Reply every time the transfer is performed. The gateway 201 obtains the next hops and the sums of the first metrics of the case where the destinations are the WSD 105, the WSD 108, and the WSD 109 on the basis of each Proactive Path Reply generated and transmitted by the WSD 105, the WSD 108, and the WSD 109. The gateway 201 next adds the obtained information to the first routing table 31b, thereby the first routing table 31b illustrated in FIG. 40 is acquired. FIG. 40 is a diagram illustrating the completed first routing table 31b.

(2-3) File Control

Various requests and various responses are used to control inter-node file transfer. The following is the description of a read request, a read response that is a response to the read request, a read-and-store request, a read-and-store response that is a response to the read-and-store request, a status request, and a status response that is a response to the status request. Descriptions of other requests and responses (write request, erase request, write response, erase response, etc.) will be omitted.

(2-3-1) Read Request

A read request is transmitted in the form of a frame (read request frame). FIG. 41 is a diagram illustrating an example of a configuration of a read request frame. In this figure, the header portion is omitted. That is, FIG. 41 illustrates the data portion of the read request frame.

As illustrated in FIG. 41, the read request frame includes a Command element, a Request Number element, a File Name Length element, a File Name element, an Offset element, and a Read Size element.

An ID indicating the read request is set as the Command element.

The Request Number element is a sequential number that is incremented by one at every transmission of a request. A unit that returns a response sets the same value as he Request Number element as a Response Number element. In this manner, matching the Response Number element with the Request Number element makes it possible to associate the request and the response with each other.

The File Name Length element is the length of the file name. The File Name element is a file name. The Offset element designates a read position of the file as an offset from the beginning of the file. The Read Size element is the size of a portion read from the offset.

(2-3-2) Read Response

In a case where a destination node of a read request frame has received the read request frame, the destination node returns a read response. The read response is transmitted in the form of a frame (read response frame).

FIG. 42 is a diagram illustrating an example of a configuration of the read response frame. In this figure, the header portion is omitted. That is, FIG. 42 illustrates the data portion of the read response frame.

As illustrated in FIG. 42, the read response frame includes a Command element, a Response Number element, a Result element, a File Data Size element, and a File Data element.

An ID indicating the read response is set as the Command element. A same value as the Response Number element of the corresponding read request frame is set as the Response Number element.

The Result element is an execution result of a read request. For example, when the file designated by the read request frame is successfully read, the Result element is set to 0, while the Result element is set to 1 when the file cannot be successfully read. In another case where an abnormality is found in a setting value, such as when the offset set in the read request frame is larger than the file size, an error is given in notification by using the Result element.

The File Data element is data (file) requested by the read request frame. The File Data Size element indicates the size of the file set in the File Data element.

(2-3-3) Read-and-Store Request

The read-and-store request is transmitted in the form of a frame (read-and-store request frame).

FIG. 43 is a diagram illustrating an example of a configuration of the read-and-store request frame. In this figure, the header portion is omitted. That is, FIG. 43 illustrates data portion of the read-and-store request frame.

Similarly to the read request frame illustrated in FIG. 41, the read-and-store request frame includes a Command element, a Request Number element, a File Name Length element, a File Name element, an Offset element, and a Read Size element.

The read-and-store request frame sets an ID indicating the read-and-store request as the Command element. All elements except the Command element of the read-and-store request frame have the same meaning as the elements of the same name in the read request frame.

(2-3-4) Read-and-Store Response

The read-and-store response is transmitted in the form of a frame (read-and-store response frame).

FIG. 44 is a diagram illustrating an example of a configuration of the read-and-store response frame. In this figure, the header portion is omitted. That is, FIG. 44 illustrates the data portion of the read-and-store response frame.

The read-and-store response frame includes a Command element, a Response Number element, a Result element, a File Name Length element, a File Name element, a File Hash element, an Offset element, a File Data Size element, and a File Data element.

An ID of the read-and-store response is set as the Command element. Each of the Response Number element, the Result element, the File Data Size element, and the File Data element has the same meaning as each of the elements f the same name of the read response frame.

The File Name Length element is the length of the file name. The File Name element is a file name. The File Hash element is a hash value of the file. The Offset element is an offset from the beginning of the file and indicates the position of the File Data element as information the file.

(2-3-5) Status Request

Each of nodes may confirm the status of other nodes by using a status request. The status is, for example, whether the node has a designated file. The status request is transmitted in the form of a frame (status request frame).

FIG. 45 is a diagram illustrating an example of a configuration of the status request frame. In FIG. 45, the header portion is omitted. That is, FIG. 45 illustrates the data portion of the status request frame.

The status request frame includes a Command element, a Request Number element, a File Name Length element, and a File Name element.

An ID indicating the status request is set as the Command element. Each of the Request Number element, the File Name Length element, and the File Name element has a meaning similar to each of the elements of the same name of other requests. The source of the status request frame can designate a file by using the File Name Length element and the File Name element.

(2-3-6) Status Response

When the destination of a status request frame receives the status request frame, the destination transmits a status response. The status response is transmitted in the form of a frame (status response frame).

FIG. 46 is a diagram illustrating an example of the configuration of the status response frame. In this figure, the header portion is omitted. That is, FIG. 46 illustrates the data portion of the status response frame.

The status response frame includes a Command element, a Response Number element, a Result element, a File Hash element, a File Name Length element, a File Name element, a File Size element, a Last Update element, and a Type element.

An ID indicating the status response is set as the Command element. Each of the Response Number element, the Result element, the File Hash element, the File Name Length element, the File Name element, and the File Size element has the same meaning as each of the elements of the same name in other responses.

The Last Update element is the time of the last update of a file. The update date and time described in the file information 33 is set as the Last Update element, for example.

The file type described in the file information 33 is set as the Type element.

(2-3-7) File Write Operation

When an instruction for file write is issued from the user 300, data that is a target file of the instruction is to be stored in the storage of any one of the WSDs 100 in cooperation with individual nodes. Operation of each of nodes for implementing the write of data for which the instruction is issued will be described below.

The gateway 200 receives a write instruction from the user 300. The gateway 200 receives the write instruction from the user 300 and then executes operation as follows.

Figure 47:
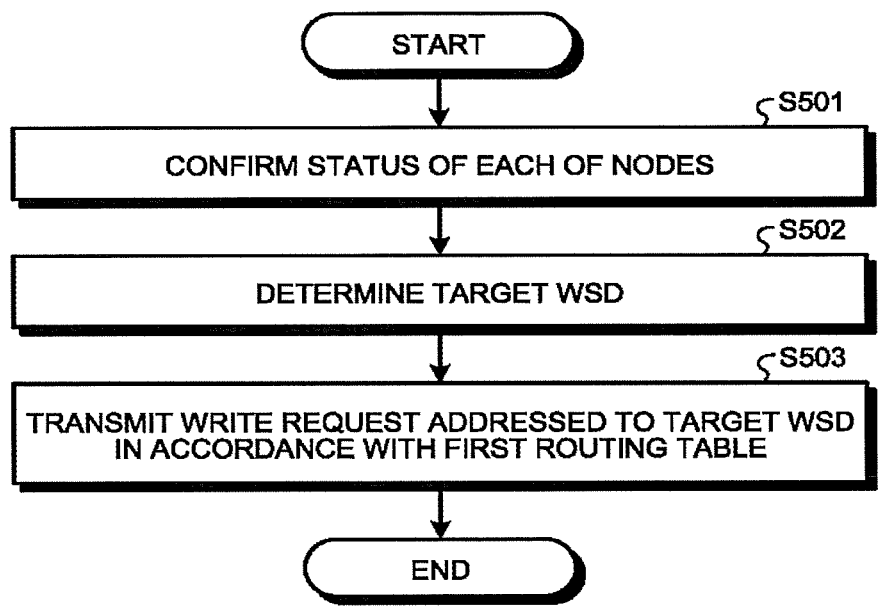
FIG. 47 is a flowchart illustrating an example of operation of the gateway at file write in the first embodiment.
Figure 48:
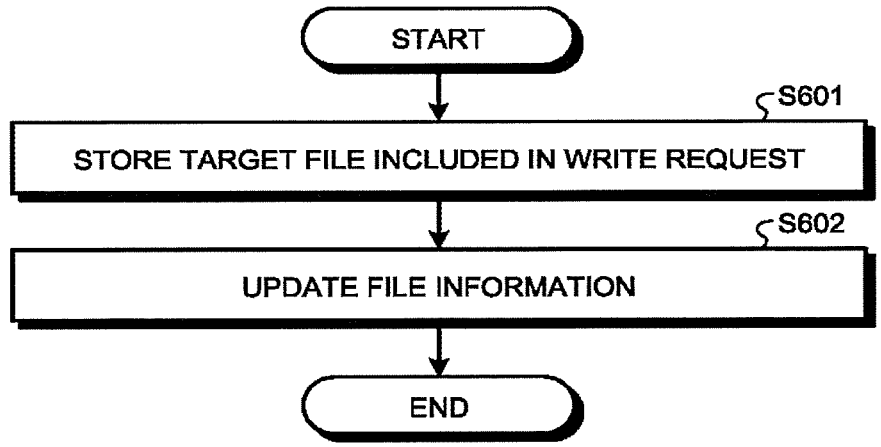
FIG. 48 is a flowchart illustrating an example of operation of a WSD (target WSD) being a destination of a write request according to the first embodiment.

FIG. 47 is a flowchart illustrating an example of operation of the gateway 200 at the time of file write. In the description of FIGS. 47 and 48, a file that is a target of the write instruction from the user 300 is referred to as a target file. The WSD 100 that is to store the target file is referred to as a target WSD 100.

First, the gateway 200 transmits a status request to each of nodes in broadcast transmission so as to confirm the status of each of the nodes (S501).

Specifically, for example, the gateway 200 transmits, to each of the nodes in broadcast transmission, a status request with a designation of the target file. Each of the nodes receives the status request and returns a status response including information indicating the presence or absence of the target file in unicast transmission. This enables the gateway 200 to learn whether each of the nodes has a target file.

Subsequently, the gateway 200 determines the WSD 100 that is to store the target file, that is, the target WSD 100 (S502).

Specifically, in a case where there is a WSD 100 already having a target file, the gateway 200 determines the WSD 100 as the target WSD 100. In a case where there is no WSD 100 already having the target file, the gateway 200 determines the target WSD 100 on the basis of the first metric of the transfer path and the free space. For example, the gateway 200 determines the WSD 100 having the smallest first metric of the transfer path and having the free space larger than the size of the target file, as the target WSD 100. The first metric of the transfer path and the free space are described in the first routing table 31.

For example, in a case where the gateway 201 has the first routing table 31b illustrated in FIG. 6 and an instruction for the write of the file #1 of 100-Mbyte size is issued, the gateway 201 selects the WSD 103 being the WSD 100 having a small first metric and having free space of 100 Mbytes or more on the basis of the first routing table 31b illustrated in FIG. 6. The gateway 201 next determines the selected WSD 103 as the target WSD 100.

Subsequently, the gateway 200 generates a write request addressed to the target WSD 100, and transmits the generated write request in accordance with the first routing table 31b (S503). Then the gateway 200 completes operation.

After transmitting the write request, the gateway 200 may receive a write response indicating whether the write was successful from the target WSD 100, and may notify the user 300 of the content of the write response. The operation related to the write response is omitted here.

The write request is transferred in accordance with the first routing table 31a of each of nodes, so as to reach the destination WSD 100.

FIG. 48 is a flowchart illustrating an example of operation of the WSD 100 (target WSD 100) of the destination of the write request. As illustrated in the figure, after receiving the write request, the target WSD 100 stores the target file included in the write request into its own storage 20 (S601).

Subsequently, the target WSD 100 updates file information 33 (S602). That is, the target WSD 100 writes the file name, update date and time, file type, or the like of the target file, into the file information 33. The file type of the target file is "original".

Execution of S602 completes operation of the target WSD 100.

Figure 49:
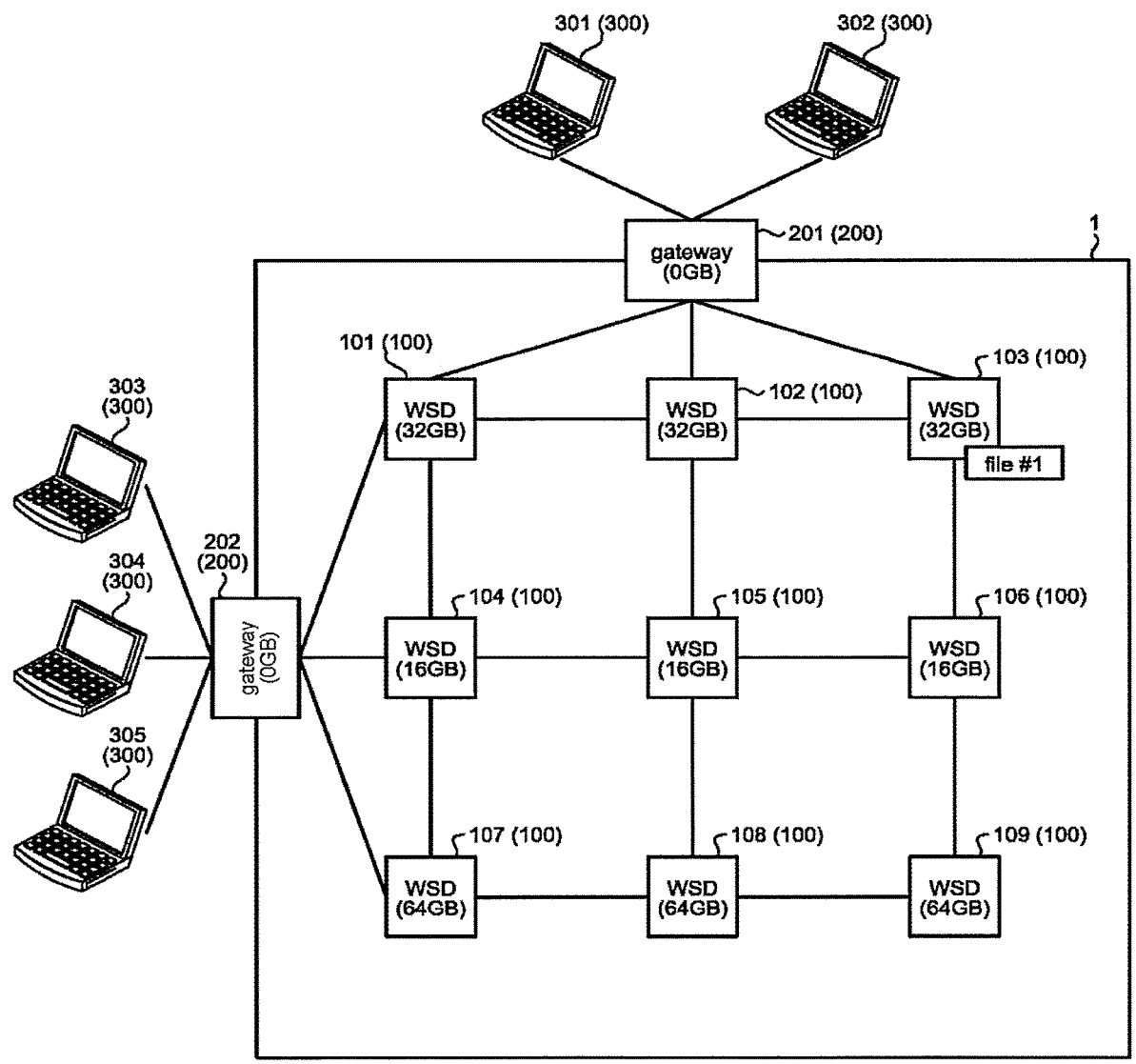
FIG. 49 is a schematic diagram illustrating a state of a storage system at the time of completion of processing in FIG. 47 and processing in FIG. 48 in a case where file is a target file and the another WSD 103 is a target WSD.

FIG. 49 is a schematic diagram illustrating a stat the storage system 1 at the time of completion of processing in FIG. 47 and processing in FIG. 48 in a case where file #1 is the target file and the WSD 103 is the target NSF. As illustrated in FIG. 49, it is shown that the file #1 is stored in the WSD 103 alone.

(2-3-8) File Read Operation

When an instruction for file read is issued from the user 300, by cooperation of individual nodes, data that is a target file of the instruction is from the WSD 100 having the data and output to the user 300 via the gateway 200. This series of operation regarding read will be described below.

The gateway 200 receives a read instruction from the user 300. The gateway 200 executes operation as follows in response to receiving the read instruction from the user 300.

Figure 50:
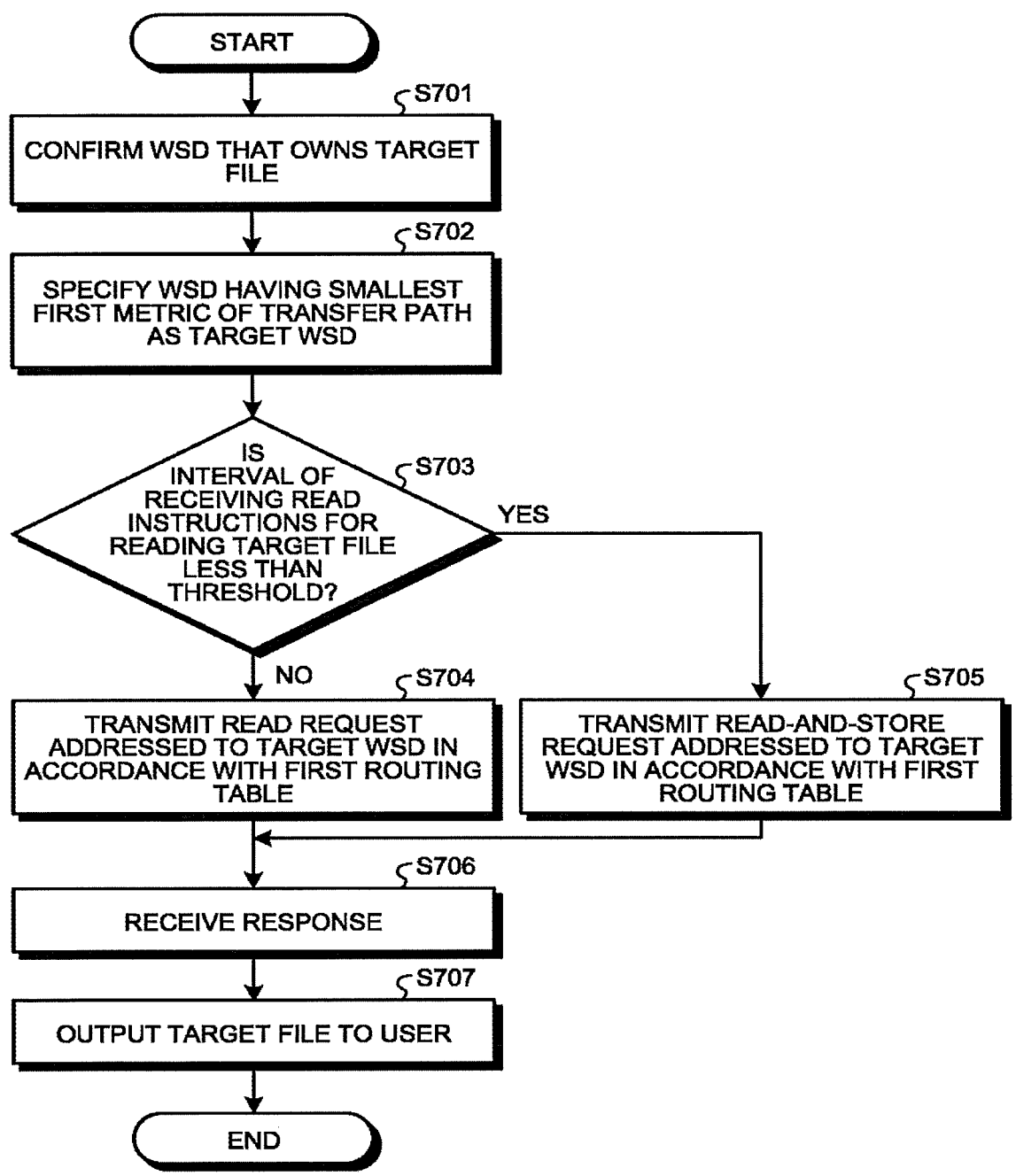
FIG. 50 is a flowchart illustrating an example of operation of the gateway at file read in the first embodiment.
Figure 51:
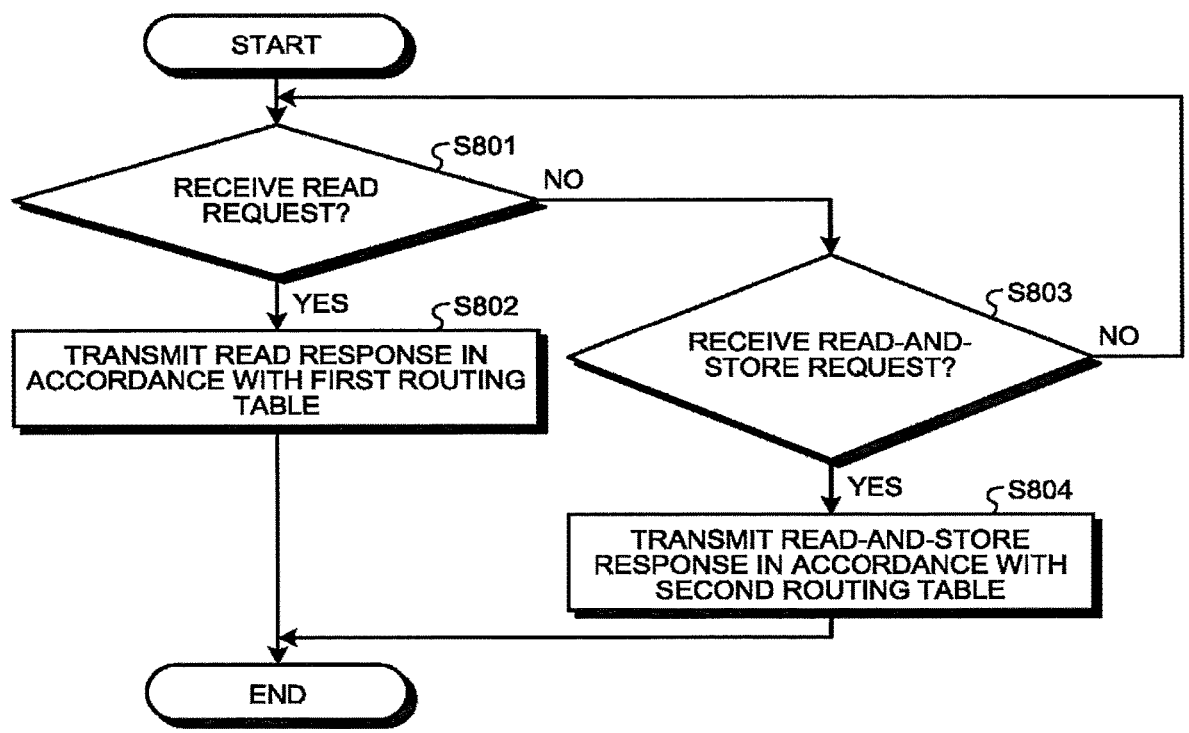
FIG. 51 is a flowchart illustrating an example of operation of a WSD (target WSD) being a destination of a request at file read (read request or read-and-store request) in the first embodiment.
Figure 52:
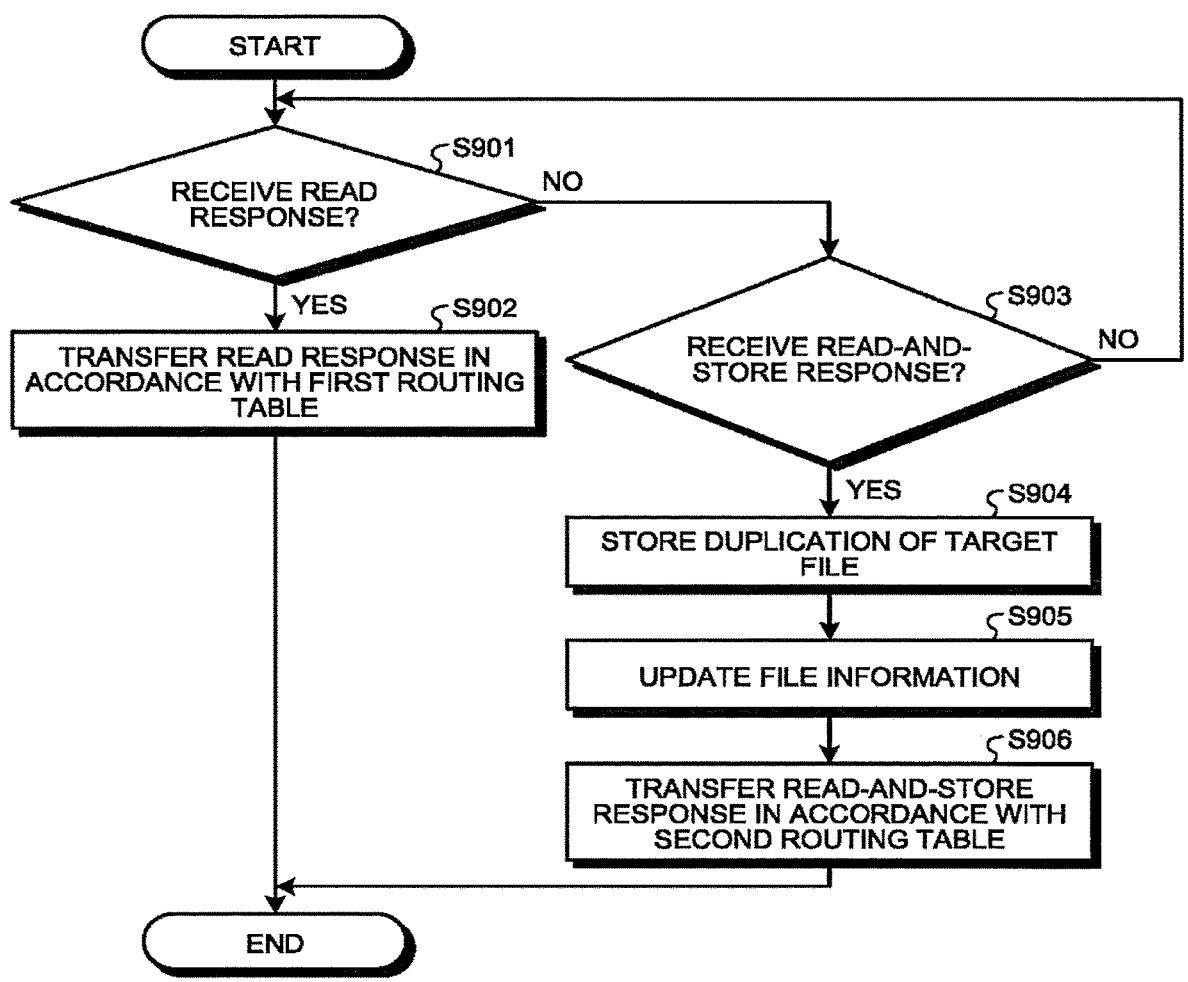
FIG. 52 is a flowchart illustrating an example of operation of a WSD that relays a response at file read in the first embodiment.

FIG. 50 is a flowchart illustrating an example of operation of the gateway 200 at the time of file read. In the explanation of FIGS. 50 to 52, a file that is a target of the read instruction from the user 300 is referred to as a target file. Note that the target file includes not merely a file of which the file type is "original" but also a file of which the file type is "duplication". The WSD 100 that is to read the target file is referred to as the target WSD 100.

First, the gateway 200 transmits a status request to each of nodes in broadcast transmission so as to confirm the WSD 100 that owns the target file (S701).

Specifically, for example, the gateway 200 transmits, to each of the nodes in broadcast transmission, a status request with designation of the target file. Each of the nodes, in response to receiving the status request, returns a status response describing the presence or absence of the target file and the file type in unicast transmission. This enables the gateway 200 to learn one or more WSDs 100 that own the target file.

Subsequently, the gateway 200 specifies the WSD 100 having the smallest first metric of the transfer path from among the one or more WSDs 100 that own the target file as the WSD 100 (target WSD 100) that to be read the target file (S702). The first metric can be obtained with reference to the first routing table 31.

Subsequently, the gateway 200 determines whether the interval of receiving read instructions for reading the target file is less than a predetermined threshold (S703).

The interval of the read instruction for reading the target file represents a time period from a first timing to a second timing. The first timing is a timing where the gateway 200 receives a read instruction for reading the target file from one user 300 to which the gateway 200 is connected. The second timing is a timing where the gateway 200 receives a read instruction for reading the target file from the one user 300 or another user 300 to which the own gateway 200 is connected. That is, S703 is a step in which the gateway 200 determines whether the time period from a timing of previous reception of a read instruction for reading the target file to a timing of current reception of a read instruction for reading the target file is lower than the predetermined threshold or not.

In a case where it is determined that the interval f receiving read instructions for reading the target file is not less than the predetermined threshold (S703: No), the gateway 200 generates a read request addressed to the target WSD 100, and transmits the read request in accordance with the first routing table (S704). The read request is transferred to the target WSD 100 in accordance with the first routing table 31.

In a case where it is determined that the interval of receiving read instructions for reading the target file is lower than the predetermined threshold (S703: Yes), the gateway 200 generates a read-and-store request addressed to the target WSD 100, and transmits the read-and-store request in accordance with the first routing table 31b (S705). The read-and-store request is transferred to the target WSD 100 in accordance with the first routing table 31.

After S704 or S705, the gateway 200 receives a response (read response or read-and-store response) (S706). The gateway 200 outputs the target file included in the response to the user 300 as the source of the instruction (S707), and completes the operation.

FIG. 51 is a flowchart illustrating an example of operation of a WSD 100 (target WSD 100) being a destination of a request at file read (read request or read-and-store request).

When the target WSD 100 has received the read request (S801: Yes), the target WSD 100 reads the target data from its own storage (storage 20), generates a read response addressed to the gateway 200, and transmits the generated read response in accordance with the first routing table 31a (S802).

The read response includes target data. The read response is transferred by each of nodes in accordance with the first routing table 31a. As a result, the read response is transferred to the gateway 200 along the transfer path with the best communication quality.

In response to receiving the read-and-store request rather than the read request (S901: No, S903: Yes), the target WSD 100 reads the target data from its own storage (storage 20), generates a read-and-store response addressed to the gateway 200, and transmits the generated read-and-store response in accordance with the second routing table 32 (S804).

The read-and-store response includes target data. The read-and-store response is transferred by each of nodes in accordance with the second routing table 32. As a result, the read-and-store response is transferred to the gateway 200 along a transfer path in consideration of communication quality and free space of the storage.

After the processing of S802 or S804, the target WSD 100 finishes the operation.

FIG. 52 is a flowchart illustrating an example of operation of a relay WSD 100 that relays a response (read response or read-and-store response) at the time of file read.

When the relay WSD 100 has received a read response (S901: Yes), the relay WSD 100 transfers the read response in accordance with the first routing table 31a (S902).

When the relay WSD 100 has received a read-and-store response rather than the read response (S901: No, S903: Yes), the relay WSD 100 generates a duplication of the target file included in the read-and-store response and stores the generated duplication in its own storage 20 (S904). The relay WSD 100 next updates the file information 33 in accordance with the operation of storing the duplication of the target file (S905).

That is, the relay WSD 100 writes the file name, update date and time, file type, or the like of the target file, into the file information 33. In the case of S905, the file type of the target file is "duplication".

Following S905, the relay WSD 100 transfers the read-and-store response in accordance with the second routing table 32 (S906).

After S902 or S906, the relay WSD 100 completes the operation.

In a case where the gateway 200 has used the read-and-store request, duplication of the target file is stored in each of the relay WSDs 100 by the read-and-store response.

Figure 53:
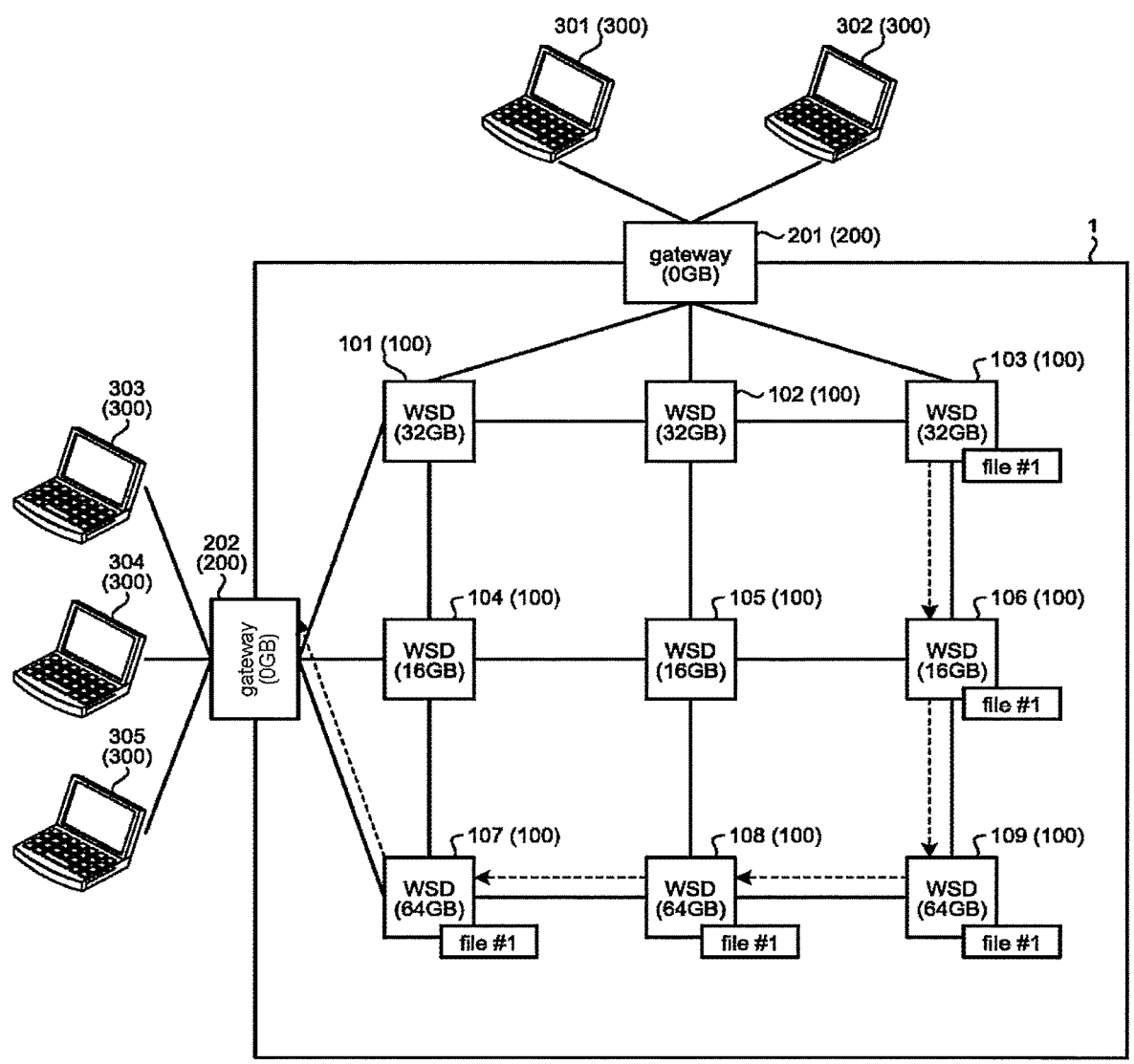
FIG. 53 is a diagram illustrating a state in which a duplication of a file is generated and stored in a case where the file is stored in the another WSD and the gateway has requested the another WSD to read the file by using a read-and-store request in the first embodiment.

FIG. 53 is a diagram illustrating a state in which a duplication of a file #1 is generated and stored in a case where the file #1 is held in the WSD 103 and the gateway 202 has requested the WSD 103 to read the file #1 by using a read-and-store request.

In response to receiving the read-and-store request, the WSD 103 generates a read-and-store response and transmits the generated read-and-store response. The read-and-store response is transferred in accordance with the second routing table 32. That is, as described with reference to FIG. 7, the read-and-store response is transferred along a transfer path (path indicated by a dotted line in FIG. 53) from the WSD 103 via the WSD 106, the WSD 109, the WSD 108, and the WSD 107 in this order to reach the gateway 202. As a result, as illustrated in FIG. 53, the file #1 (duplication of file #1) is stored in each of the WSD 106, the WSD 109, the WSD 108, and the WSD 107 that relay the read-and-store response.

In a case where an instruction for read of the file #1 is issued thereafter, the gateway 200 can select the destination of the read request or the read-and-store request from among the WSD 103, the WSD 106, the WSD 109, the WSD 108, and the WSD 107.

(2-3-9) File Duplication Processing

As described above, when a read-and-store request has been used, duplication of the file is stored in each relay WSD 100. However, storing a large number of duplications of files in a WSD 100 would lead to exhaustion of the free space of the storage of the WSD 100.

To avoid this, each of the WSDs 100 in the embodiment is configured to autonomously erase a duplication in accordance with an elapsed time from storing the duplication of the file.

Figure 54:
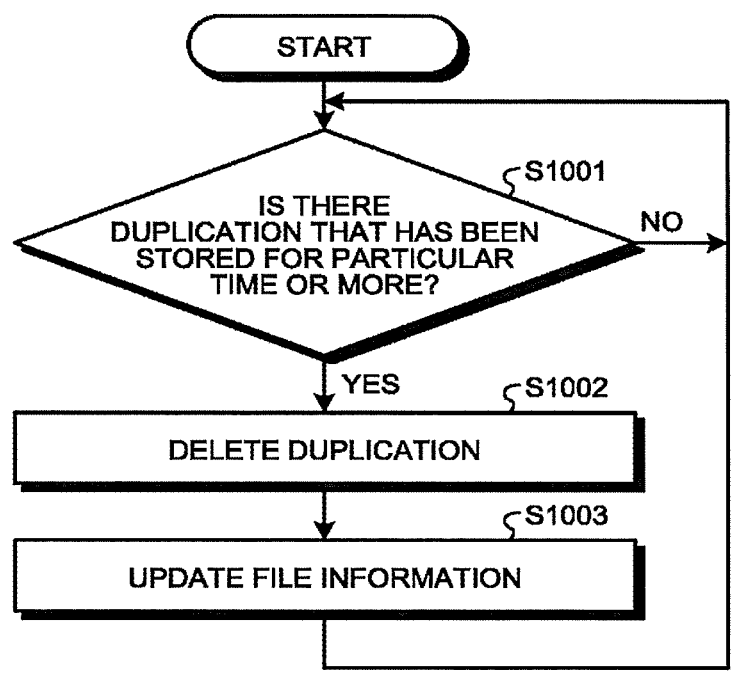
FIG. 54 is a flowchart illustrating an example of operation of erasing a duplication of a file performed by a WSD in the first embodiment.

FIG. 54 is a flowchart illustrating an example of operation of erasing a duplication of a file performed by the WSD 100. First, a WSD 100 determines whether there is a file having a file type of "duplication" that has been stored for a particular time or more (S1001). In S1001, the WSD 100 detects a file having a file type of "duplication" with reference to the file information 33 held by the own WSD 100.

In a case where it is determined that there is no file having a file type of "duplication" (S1001: No) that has been stored for the particular time or more, the determination processing of 31001 is executed again.

In a case where it is determined that there is a file having a file type of "duplication" (S1001: Yes) that has been stored for the particular time or more, the WSD 100 deletes the file from the storage (S1002). Next, the WSD 100 updates the file information 33 in accordance with the operation of S100 (S1003). That is, the WSD 100 deletes the record related to the deleted file from the file information 33.

After execution of S1003, the determination processing of S1001 is executed again.

As described above, according to the first embodiment, each WSD 100 corrects the first metric indicating the communication quality on the basis of the free space so as to obtain the second metric and determines the communication path on the basis of the second metric.

This enables each WSD 100 to transfer information on the transfer path that takes the free space into consideration.

Note that the second metric may be obtained by correcting the first metric on the basis of the lifetime information of the WSD 100 in addition to the free space. The lifetime information is the number of faulty sectors that can be obtained from S.M.A.R.T. information, for example. The second metric is calculated such that the shorter the lifetime (for example, the greater the number of faulty sectors) of the storage device 100, the greater the second metric. The use of the lifetime information for the calculating the second metric makes it possible to transfer a read-and-store response on a transfer path which avoids the WSD 100 having high likelihood of breaking down as much as possible.

Moreover, in response to receiving a signal such as a Proactive Path Request with Metric With Free Space Flag of 1 or a Proactive Path Reply with Metric With Free Space Flag of 1 from another node, a WSD 100 adds, to the Metric element contained in the signal, the second metric up to the signal transfer source.

This makes it possible to obtain a metric that takes a free space into consideration as the metric of the transfer path. In other words, it is possible to achieve information transfer on a transfer path that takes a free space into consideration.

Note that the processing of correcting the first metric is processing of correcting on the basis of the free space of its own node and the free space of the signal transfer source, as exemplified by formula (2).

More specifically, the processing of correcting the first metric includes processing of dividing the first metric by an average value of the free space of its own node and the free space of the transfer source of the signal.

As a result, the second metric is calculated such that the greater the free space of each node within the transfer path, the smaller the second metric in the transfer path.

Meanwhile, the WSD 100 updates a Metric element of a signal, such as a Proactive Path Request having Metric With Free Space Flag of 1 or a Proactive Path Reply having Metric With Free Space Flag of 1, using a value obtained by adding, to the Metric element, the second metric up to the signal transfer source, and transfers the updated signal to a node other than the transfer source.

Since the second metric is added to the Metric element every time the signal such as a Proactive Path Request with Metric With Free Space Flag of 1 or Proactive Path Reply with Metric With Free Space Flag of 1 is transferred, it is possible to obtain the sum of the second metrics of the transfer path.

Furthermore, the WSD 100 adds, to the second routing table 32, a record in which the node as the originator of the Proactive Path Request with Metric With Free Space Flag of 1 is set as "Destination", the node as the transfer source of the Proactive Path Request is set as "Next Hop", and the updated second metric is set as "Second Metric".

With this configuration, the WSD 100 can generate the second routing table 32 in a case where the WSD 100 has received a Proactive Path Request with Metric With Free Space Flag of 1.

Moreover, the WSD 100 receives a read-and-store request. The WSD 100, when the destination of the read-and-store request is the own WSD 100, generates a read-and-store response, which is a response to the read-and-store request. Then, the WSD 100 transmits the generated read-and-store response in accordance with the second routing table 32.

This enables transfer of the read-and-store response on the transfer path that takes a free space of a relay node into consideration.

In a case where the WSD 100 received the read-and-store response, the WSD 100 generates a duplication of a file included in the read-and-store response and stores the duplication in its own storage 20.

This enables the file requested by the read-and-store request to be stored in the plurality of WSDs 100, making it possible to prevent concentration of processing on one WSD 100 even when the frequency of read instructions for reading the file is high. This leads to enhancement of the performance of the storage system 1.

Furthermore, the gateway 200 transmits a read-and-store request when being instructed, front a user 300, to read a file. The WSD 100 at the destination of the read-and-store request has the preliminarily generated second routing table 32. In response to receiving the read-and-store request, the WSD 100 generates a read-and-store response including a target file addressed to the gateway 200, and transmits the generated read-and-store response in accordance with the second routing table 32. In other words, the WSD 100 transfers the read-and-store response to a WSD 100 constituting a transfer path having the smallest second metric among adjacent WSDs 100.

This enables transfer of the read-and-store response on the transfer path that takes a free space of a relay node into consideration.

In a case where the WSD 100 received the read-and-store response, the WSD 100 generates a duplication of a file included in the read-and-store response and stores the duplication in the storage 20. In a case where an instruction for reading an identical file is issued from the user 300 again, the gateway 200 can generate and transmit a read request or a read-and-store request addressed to a WSD 100 that owns a duplication of the file.

Consequently, even when the frequency of occurrence of instructions to read an identical file is high, it is possible to prevent concentration of processing on one WSD 100.

Additionally, the WSD 100 deletes the duplication at a timing based on the elapsed time from the timing of start of storing the duplication of the file.

This prevents exhaustion of the free space of the storage 20 resulted from storing a large amount of duplications of the file.

Second Embodiment

The use of a read-and-store request enables an identical file to be stored in the plurality of WSDs 100. In a case where a file as a target of a read instruction is stored in each of a plurality of WSDs 100, the gateway 200 may read different portions of an identical file from the plurality of WSDs 100, and then may combine the different portions transferred from the plurality of WSDs 100 and output the combined file.

For example, there is an assumable case where file #1 is stored in WSD 103, WSD 106, WSD 107, WSD 108, and WSD 109 as illustrated in FIG. 53.

In a case where a read instruction for the file #1 is issued, the gateway 202 first uses a status request to learn that each of the WSD 103, the WSD 106, the WSD 107, the WSD 108, and the WSD 109 has the file #1.

Subsequently, the gateway 202 causes each of the WSD 103, the WSD 106, the WSD 107, the WSD 108, and the WSD 109 to return the transfer path from each of the WSDs to the gateway 202. This procedure leads to generation of a table illustrating the owner of file next hop, first metric, and the transfer path, as illustrated in FIG. 55. Note that the transfer path can he obtained by using a known network command such as traceroute.

The gateway 202 selects, from the table illustrated in FIG. 55, a plurality of owners of the file #1 having no overlapping relay nodes constituting the transfer path and having a small first metric of the transfer path, as a destination of a request (read request or read-and-store request).

In the case of the table of FIG. 55, the gateway 202 selects the WSD 106 and the WSD 107 as the destinations of the request, for example.

For example, in a case where the WSD 103 or the WSD 109 is assumed to be selected as a destination, the WSD 105 and the WSD 104 are overlapped as relay nodes with respect to a case where WSD 106 is a destination. In addition, the first metric of each of transfer path to the WSD 103 and a transfer path to the WSD 109 is larger than the first metric of a transfer path to the WSD 106. Accordingly, neither the WSD 103 nor the WSD 109 is selected as a destination of the request.

In another case where each of the WSD 108 and the WSD 107 is assumed to be selected as a destination, the WSD 107 is overlapped between transfer paths. In addition, the first metric of the transfer path to the WSD 108 is larger than the first metric to the WSD 107. Accordingly, the WSD 108 would not be selected as a destination of the request.

Overlapping of transfer paths would increase the amount of necessary processing in the overlapping relay node, leading to deterioration of the transfer rate. This might reduce the throughput as compared with the case where a file is transmitted to a single WSD 100. In contrast, in the second embodiment, the plurality of WSDs 100 of which transfer paths of responses are not overlapped with each other are selected as destinations of the request. Therefore, deterioration in throughput is suppressed.

For example, the gateway 202 generates and transmits a request to read the first half of the file #1, addressed to the WSD 106. In addition to this, the gateway 202 generates and transmits a request to read the second half of the file #1, addressed to the WSD 107. The gateway 202 combines the first half of the file #1 contained in the response transmitted from the WSD 106 and the second half of the file #1 contained in the response transmitted from the WSD 107 to generate a full file #1, and outputs the generated full file #1 to the user 300.

In this manner, according to the second embodiment, the gateway 200 transmits a request to each of two WSDs 100 storing a duplication of the requested file to read different portions of the file.

According to this, the storage system 1 is able to output the requested file in high rate. That is, the performance of the storage system 1 is enhanced.

Third Embodiment

In a case where distance to an adjacent node becomes to be too long or a source of the radio waves interfering with the radio waves of the wireless LAN stars operation near a WSD 100, the WSD 100 might become to be incommunicable. In addition, power supply interruption would lead to make a WSD 100 incommunicable.

In a storage network, in a case where a relay WSD 100 on a transfer path of a file becomes to be incommunicable due to a problem of a power supply or a radio wave during transfer of the file, it is desirable to change the transfer path.

In a case where a relay WSD 100 on the transfer path of a read-and-store response becomes to be incommunicable during transmission of a read-and-store response, a WSD 100 suspends the transmission of the read-and-store response and regenerates the second routing table 32. Specifically, the WSD 100 discards the second routing table 32 used so far and transmits a Proactive Path Request in broadcast transmission so as to newly generate the second routing table 32.

The newly generated second routing table 32 makes it possible to learn the next hop that corresponds to the transfer path avoiding the incommunicable WSD 100. The WSD 100 resumes transmission of the read-and-store response in accordance with the newly generated second routing table 32.

For example, there is an assumable case where the WSD #6 becomes to be incommunicable during transmission of a read-and-store request from the WSD 103 to the gateway 202 based on the second routing table 32 illustrated in FIG. 8. Here, the read-and-store request contains the file #1.

According to the second routing table 32 illustrated in FIG. 8, the read-and-store request is to be transferred on a transfer path via the WSD 106, the WSD 109, the WSD 108, and the WSD 107 in this order to reach the gateway 202.

Figure 56:
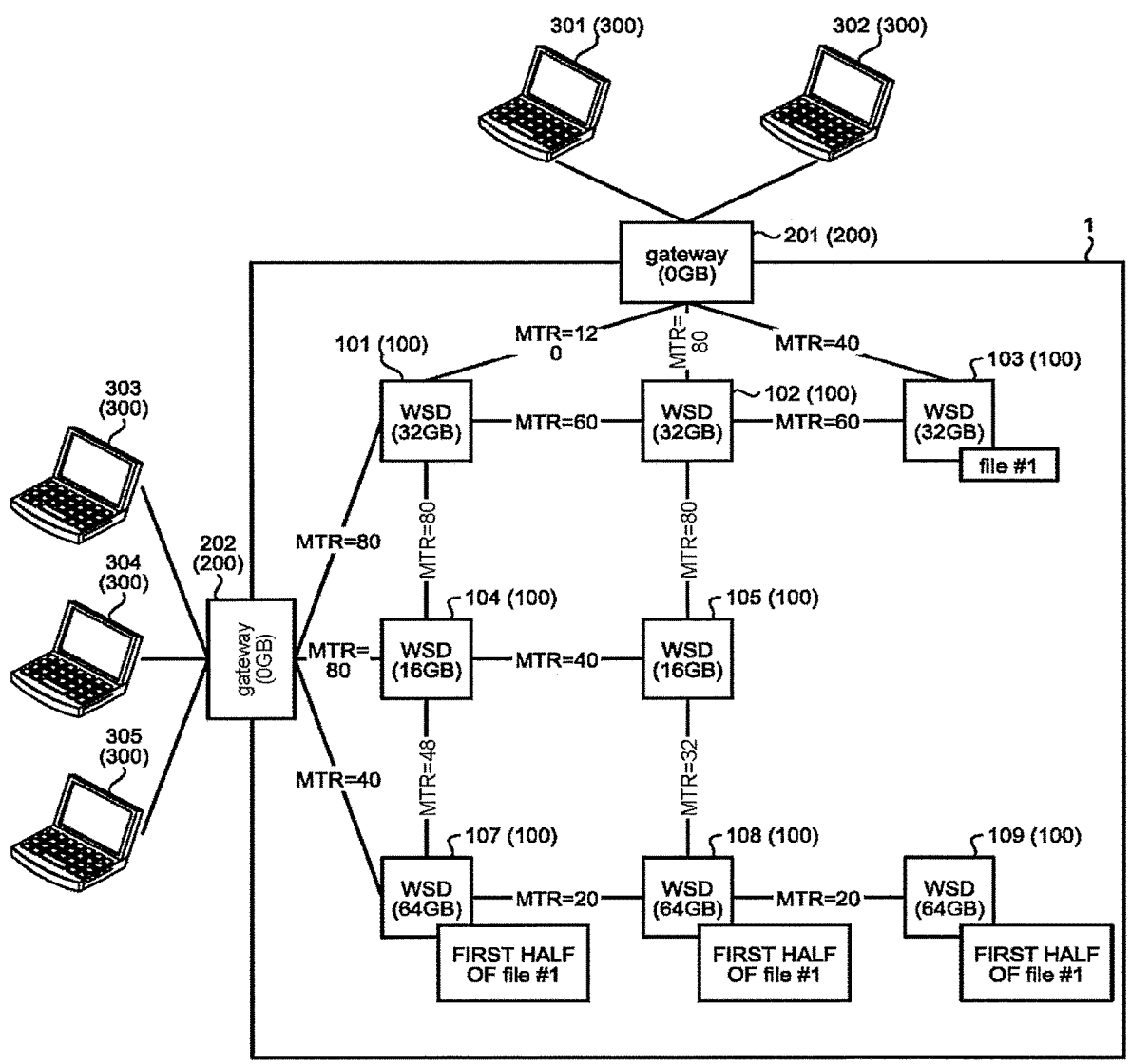
FIG. 56 is a schematic diagram illustrating a state of the storage system in a case where the still another WSD has a communication failure according to a third embodiment.

In the case where the WSD 106 becomes to be incommunicable during the transfer of the read-and-store request, the transmission of the read-and-store request is interrupted while the first half of the file #1 is stored in each of the WSD 107, the WSD 108, and the WSD 109, as illustrated in FIG. 56.

Then, the WSD 103 discards the second routing table 32 used up to the point where the WSD 106 becomes to be incommunicable. Subsequently, the WSD 103 transmits a Proactive Path Request in broadcast transmission so as to regenerate the second routing table 32.

FIG. 57 is a diagram illustrating the regenerated second routing table 32. The second routing table 32 illustrated in FIG. 8 includes a record in which the WSD 106 is recorded as the next hop. The regenerated second routing table 32 of FIG. 57 does not include the record in which the WSD 106 is recorded as the next hop. That is, all the records recorded in the regenerated second routing table 32 do not pass through the WSD 106.

The WSD 103 resumes transmission of the read-and-store request. The WSD 103 transmits a read-and-store request to the WSD 102 on the basis of the second routing table 32 illustrated in FIG. 57. With this procedure, the read-and-store request after restart of transmission transferred along the transfer path via the WSD 102 and the WSD 101 in this order to reach the gateway 202.

Figure 58:
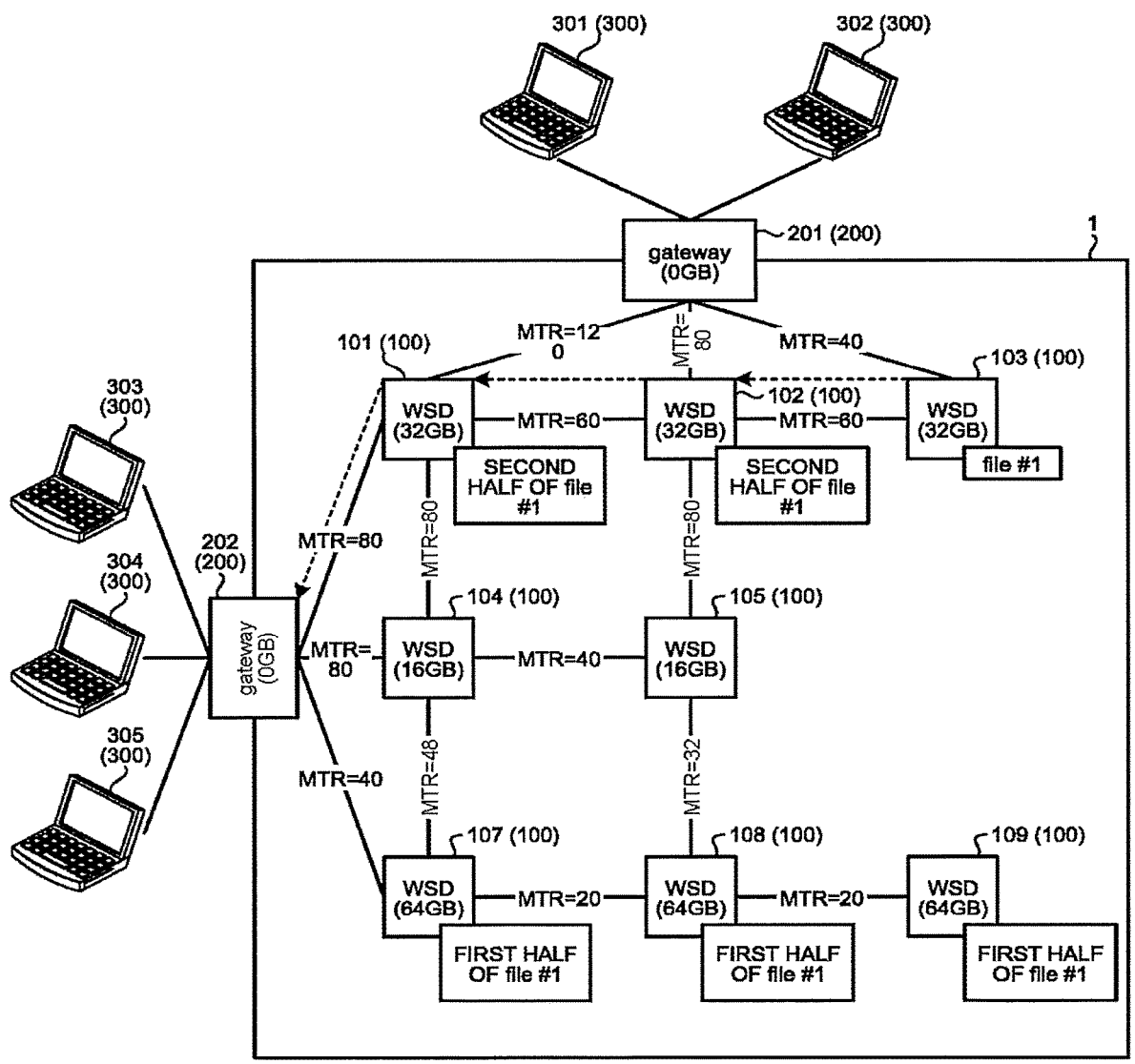
FIG. 58 is a schematic diagram illustrating a state of the storage system after completion of transmission of a read-and-store response including a file in the third embodiment.

FIG. 58 is a schematic diagram illustrating the state of the storage system I after completion of transmission of the read-and-store response including the file #1. After resuming the transmission of the read-and-store response, the read-and-store response passes through the WSD 102 and the WSD 101. This enables each of the WSD 102 and the WSD 101 to store the second half of the file #1.

Thereafter, in a case where the gateway 202 has received an instruction to read the file #1, the gateway 202 confirms each WSD 100 that owns the file #1 by transmitting a status request in broadcast transmission, or the like. The gateway 202 learns front this confirmation that a portion of the file #1 is held in each of the WSD 101, the WSD 102, the WSD 107, the WSD 108, and the WSD 109, and that the original of the file #1 is held in the WSD 103, as illustrated in FIG. 59.

According to FIG. 59, the first metric of the transfer path to the WSD 101 is 20, the first metric of the transfer path to the WSD 107 is 40, indicating that each of the first metrics is smaller than the first metric of the transfer path to the NSF 103 that owns the original of the file #1. In addition, FIG. 59 indicates that the file #1 can be restored by combining portions of the file #1 individually possessed by the WSD 101 and the WSD 107.

Accordingly, the gateway 202 transmits a read request or a read-and-store request to the WSD 101 and the WSD 107 so as to obtain the file #1. This operation enables the gateway 202 to combine the file #1 partially stored in the WSD 101 and the WSD 107 and output the combined file #1 to the user 300.

The above description is the case where the technology of the embodiment is applied on the basis of the IEEE 802.11s. The technology of the embodiment may be applied to the storage device 100, the gateway 200, and the storage system 1 that perform communication on the basis of any standard. The frame configuration of the signals (various requests and responses) transmitted and received by each of nodes of the embodiment is not limited to the frame configuration described above. It is possible to add or delete any element to or from a frame configuration of signals (various requests and responses) to be transmitted and received by each of nodes of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a wireless communication circuit configured to connect to an external first device by wireless communication;
a storage having a storage region; and
a controller circuit configured to control the storage and to correct first information being numerical information indicating quality of the wireless communication with the first device based on a first capacity which is a free space of the storage region of the storage to obtain second information being the corrected first information, wherein
processing of correcting the first information includes processing of dividing the first information by an average value of the first capacity and a second capacity which is a free space of a storage region of a storage provided in the first device.

2. The storage device according to claim 1,
wherein in a case where the controller circuit has received a first signal containing third information being the numerical information from the first device, the controller circuit is configured to add the second information to the third information.

3. The storage device according to claim 2,
wherein the wireless communication circuit is configured to connect to an external second device different from the first device by wireless communication, and
the controller circuit is configured to update the third information with a value obtained by adding the second information to the third information, and to transfer first signal containing the updated third information to the second device.

4. The storage device according to claim 3,
wherein the first signal is a signal issued by a third device, and
the controller circuit is configured to generate and store path information for a path to the third device, the path information defining the first device as a next hop and containing the updated third information as a metric.

5. The storage device according to claim 4,
wherein the wireless communication circuit wirelessly connects to a plurality of fourth devices including the first device and the second device, and
the controller circuit is configured to receive a second signal requesting data, the controller circuit s configured to generate a third signal that is a response to the second signal and that contains the data in a case where a destination of the second signal is the storage device including the controller circuit, and to determine a fifth device that relays the third signal among the plurality of fourth devices based on the path information.

6. The storage device according to claim 5,
wherein, in a case where the controller circuit has received the third signal, the controller circuit stores a duplication of data contained in the received third signal into the storage provided in the storage device.

7. A storage system comprising a storage network including a plurality of storage devices connected to each other by wireless communication,
wherein each of the plurality of storage devices includes a storage having a storage region and is configured to:
control the storage included in each of the plurality of storage devices itself;
correct first information being numerical information indicating quality of the wireless communication based on a free space of the storage region of each of the plurality of storage devices itself; and
determine a path of the wireless communication within the storage network based on second information that is the corrected first information, wherein
processing of correcting the first information includes processing of dividing each of the first information of two storage devices that are wirelessly connected to each other among the plurality of storage devices by an average value of each of a free space of the storage region of the two storage devices.

8. The storage system according to claim 7, further comprising a gateway connected to an external device,
wherein the gateway is configured to transmit a first signal in a case where an instruction for reading first data stored in a first storage device among the plurality of storage devices is issued from the external device, and the first storage device is connected to two or more second storage devices among the plurality of storage devices by wireless communication, and the first storage device is configured to generate a first routing table based on the second information, to generate a second signal addressed to the gateway and containing the first data in accordance with having received the first signal from the gateway, and to determine a third storage device that relays the second signal among the plurality of second storage devices based on the first routing table.

9. The storage system according to claim 8,
wherein the third storage device is configured to generate second data that is a duplication of the first data, and to store the generated second data.

10. The storage system according to claim 9,
wherein the gateway transmits a third signal addressed to the third storage device in a case where an instruction for reading the first data is issued from the external device again, and
in accordance with having received the third signal, the third storage device is configured to generate a fourth signal addressed to the gateway and containing the second data, and to transmit the generated fourth signal.

11. The storage system according to claim 10,
wherein the third storage device includes a fourth storage device and a fifth storage device,
in a case where an instruction for reading the first data is issued from the external device again, the gateway is configured to transmit a third signal addressed to the fourth storage device and to transmit a fourth signal addressed to the fifth storage device,
in accordance with having received the third signal, the fourth storage device is configured to generate and transmits a fifth signal addressed to the gateway and containing a portion of the second data, and
in accordance with having received the fourth signal, the fifth storage device is configured to transmit a sixth signal addressed to the gateway and containing another portion of the second data.

12. The storage system according to claim 8,
wherein, in a case where one of the plurality of storage devices on a transfer path of the second signal has become to be incommunicable during transmission of the second signal, the first storage device is configured to regenerate the first routing table, and to resume transmission of the second signal based on the regenerated first routing table.

13. The storage system according to claim 9,
wherein the third storage device is configured to delete the second data at a timing based on an elapsed time from the timing of start of storing the second data.

14. The storage system according to claim 9,
wherein the gateway is configured to receive instructions for reading the first data plural times, and to determine whether to transmit the first signal or a third signal based on a time interval of receptions of the instructions for reading the first data, and
the third signal is a signal for requesting the first data and not for requesting of storing the second data.

15. The storage system according to claim 14,
wherein the first storage device is configured to generate a second routing table based on the first information, to generate a fourth signal addressed to the gateway and containing the first data in accordance with having received the third signal, and to determine a storage device that relays the fourth signal among the plurality of storage devices based on the second routing table.

16. A method of wireless communication between storage devices, each of the storage devices having a wireless communication function and comprising a storage, each of the storage devices being configured to control the storage included in each of the storage devices itself, the method comprising:
by a storage device among the storage devices, correcting first information being numerical information indicating quality of wireless communication between a first device connected by wireless communication to the storage device and the storage device based on first capacity being a free space of a storage region of the storage included in the storage device itself; and
obtaining second information being the corrected first information, wherein
the correcting the first information includes processing of dividing the first information by an average value of the first capacity and a second capacity which is a free space of a storage region of a storage provided in the first device.

17. A method of wireless communication in a storage network including storage devices, each of the storage devices having a wireless communication function and comprising a storage, each of the storage devices being configured to control the storage included in each of the storage devices itself, the method comprising:
by a storage device among the storage devices, correcting first information being numerical information indicating quality of wireless communication based on a free space of a storage region of the storage included in the storage device itself; and
determining a path of the wireless communication within the storage network based on second information being the corrected first information, wherein
the correcting the first information includes processing of dividing each of the first information of two storage devices that are wirelessly connected to each other among the plurality of storage devices by an average value of each of a free space of the storage region of the two storage devices.

18. The method according to claim 17, wherein
the storage network further includes a gateway connected to an external device, and the method further comprising:
by the gateway, transmitting a first signal in a case where an instruction for reading first data stored in a first storage device among the storage devices is issued from the external device, the first storage device being connected to two or more second storage devices among the storage devices by wireless communication,
by the first storage device, generating a first routing table based on the second information,
by the first storage device, generating a second signal addressed to the gateway and containing the first data in accordance with having received the first signal from the gateway,
by the first storage device, determining a third storage device that relays the second signal among the plurality of second storage devices based on the first routing table.

* * * * *